United States Patent
Hutz et al.

(10) Patent No.: US 10,419,908 B1
(45) Date of Patent: Sep. 17, 2019

(54) WI-FI PROVISIONING TECHNIQUES

(71) Applicant: Alarm.com Incorporated, Tysons, VA (US)

(72) Inventors: David James Hutz, Herndon, VA (US); Christopher Silverman, Alexandria, VA (US); Benjamin Asher Berg, Washington, DC (US); Yang Zheng, Tysons, VA (US)

(73) Assignee: Alarm.com Incorporated, Tysons, VA (US)

(*) Notice: Subject to any disclaimer, the term of this patent is extended or adjusted under 35 U.S.C. 154(b) by 0 days.

(21) Appl. No.: 15/861,202

(22) Filed: Jan. 3, 2018

Related U.S. Application Data

(60) Provisional application No. 62/441,684, filed on Jan. 3, 2017.

(51) Int. Cl.
| | |
|---|---|
| *H04W 4/50* | (2018.01) |
| *H04L 29/12* | (2006.01) |
| *H04W 76/10* | (2018.01) |
| *H04W 60/00* | (2009.01) |

(52) U.S. Cl.
CPC ........... *H04W 4/50* (2018.02); *H04L 61/6022* (2013.01); *H04W 60/00* (2013.01); *H04W 76/10* (2018.02)

(58) Field of Classification Search
CPC ....... H04W 4/50; H04W 60/00; H04W 76/10; H04W 72/04; H04W 72/12; H04W 76/00; H04L 61/6022; H04B 7/2121; H04B 7/2123; H04J 2203/0069; H04Q 2213/394
See application file for complete search history.

(56) References Cited

U.S. PATENT DOCUMENTS

| | | | |
|---|---|---|---|
| 6,865,185 B1 | 3/2005 | Patel et al. | |
| 6,970,719 B1 | 11/2005 | McConnell et al. | |
| 7,305,240 B2 | 12/2007 | Chou et al. | |
| 8,626,115 B2 | 1/2014 | Raleigh et al. | |
| 9,456,331 B2* | 9/2016 | Rayanki | H04W 8/005 |
| 10,057,813 B1* | 8/2018 | Likar | H04W 12/06 |
| 2006/0039313 A1 | 2/2006 | Chou et al. | |
| 2008/0065752 A1 | 3/2008 | Ch'ng et al. | |
| 2008/0076412 A1* | 3/2008 | Khetawat | H04W 24/02 |
| | | | 455/432.1 |
| 2010/0268823 A1 | 10/2010 | Torarp et al. | |
| 2011/0320588 A1 | 12/2011 | Raleigh | |

* cited by examiner

*Primary Examiner* — Sharad Rampuria
(74) *Attorney, Agent, or Firm* — Fish & Richardson P.C.

(57) ABSTRACT

Techniques are described for provisioning Wi-Fi network connectivity for a wireless device without requiring a user to provide network credentials to allow the wireless device to establish a network connection. In some implementations, a method is performed by a computing device to provision a wireless network connection. A MAC address associated with a property is obtained. A temporary network credential for the wireless device is determined based on the MAC Address of the wireless device. The temporary network credential permits the wireless device to connect to a temporary network. The temporary network credential for the wireless device is available over the temporary network. A determination that the wireless device has connected to the temporary network using the temporary network credential for the wireless device is made. An instruction is transmitted to the wireless device over the temporary network in response to the determination.

18 Claims, 14 Drawing Sheets

US 10,419,908 B1

WI-FI PROVISIONING TECHNIQUES

CROSS-REFERENCE TO RELATED APPLICATIONS

This application claims the benefit of U.S. Provisional Patent Application No. 62/441,684, filed on Jan. 3, 2017 and titled "WI-FI PROVISIONING TECHNIQUES," which is incorporated herein by reference in its entirety.

TECHNICAL FIELD

This disclosure relates to network technology and, for example, techniques for establishing wireless network connections.

BACKGROUND

Wireless local area networks (WLAN) enable wireless devices to establish a network connection using a wireless distribution method, usually providing a connection through an access point for internet access. For example, Wi-Fi (or "WiFi") is a technology that allows electronic devices to connection to a WLAN. A Wi-Fi network may be password protected, which allows a device within its range to access the resources of the WLAN after presenting network credentials associated with the Wi-Fi network.

SUMMARY

Techniques are described for provisioning Wi-Fi network connectivity for a wireless device without requiring a user to provide network credentials to allow the wireless device to establish a network connection. In some instances, a control unit associated with a monitoring system of a property can be used as a temporary network access point that provides temporary network credentials based on a predetermined media access control (MAC) address of the wireless device. The wireless device can be pre-configured to recognize the temporary network credentials as its default settings. The control unit then establishes a temporary network connection with the wireless device using the temporary network credentials. Instructions are then transmitted from the control unit to the wireless device to adjust the network configuration of the wireless device to enable the wireless device to establish a network connection over a local network of the property. In this regard, a new wireless device to be installed within a property can be reconfigured to connect to a local network without manual configuration.

In one general aspect, a computer-implemented method may be performed by a control unit of a property or an associated server to provision a network connection for a wireless device. The method can include obtaining network configuration data for a wireless device, establishing a temporary network connection between the wireless device and a control unit, and reconfiguring a network configuration for the wireless device. The method may be implemented in various implementations described in more detail below.

In another general aspect, a computer-implemented method may be performed by the control unit or the server to restore a network connection for a wireless device after a network configuration of a network has changed. The method can include detecting a change in a network configuration of a network associated with a property, obtaining data indicating an updated network configuration for the network, and reconfiguring a network configuration for the wireless device.

The details of one or more implementations are set forth in the accompanying drawings and the description below. Other features will be apparent from the description and drawings.

DESCRIPTION OF DRAWINGS

FIGS. 3A-3B illustrate examples of techniques for provisioning a wireless network connection once a wireless device has been turned on.

Figure 1A:
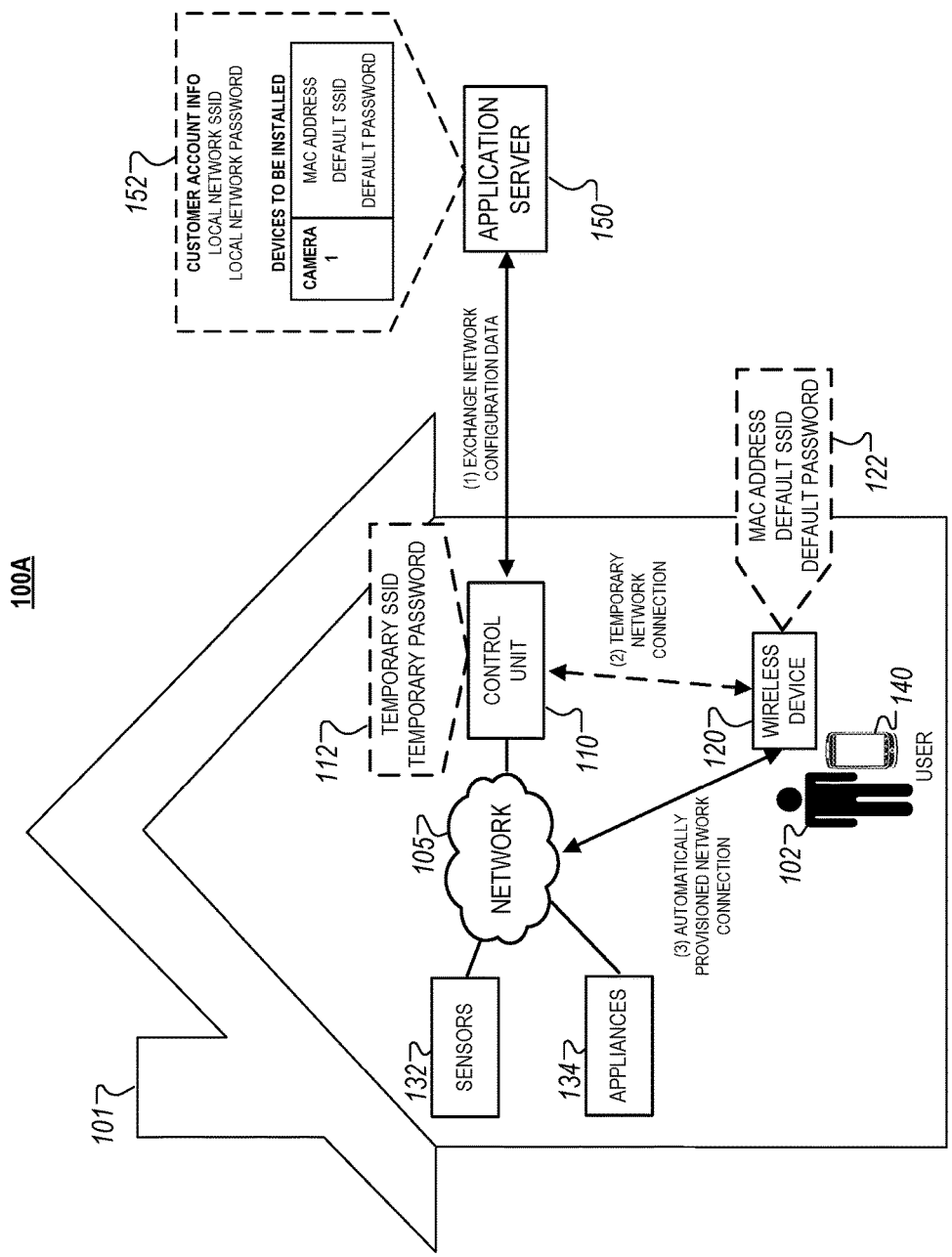
FIG. 1A illustrates an example of a system that is capable of provisioning a wireless network connection.

The details of one or more implementations are set forth in the accompanying drawings and the description, below. Other potential features and advantages of the disclosure will be apparent from the description and drawings, and from the claims.

DETAILED DESCRIPTION

Techniques are described for provisioning Wi-Fi network connectivity for a wireless device without requiring a user to provide network credentials to allow the wireless device to establish a network connection. In some instances, a control unit associated with a monitoring system of a property can be used as a temporary network access point that provides temporary network credentials based on a predetermined MAC address of the wireless device. The wireless device can be pre-configured to recognize the temporary network credentials as its default settings. The control unit then establishes a temporary network connection with the wireless device using the temporary network credentials. Instructions are then transmitted from the control unit to the wireless device to adjust the network configuration of the wireless device to enable the wireless device to establish a network connection over a local network of the property. In this regard, a new wireless device to be installed within a property can be reconfigured to connect to a local network without manual configuration.

As described throughout, "network configuration data" generally refers to the information needed to connect to a wireless network. For example, network configuration data may include an SSID, a password, and an encryption protocol (e.g., Wired Equivalent Privacy (WEP), Wi-Fi Protected Access (WPA), etc.) that is used by a wireless device to establish a connection to a WLAN.

A "default network configuration" refers to a pre-configured SSID and password that is associated with a MAC address of a wireless device to be installed within the property. The default network configuration may be assigned during the manufacturing of the wireless device, or at any time point prior to installation of the wireless device within a property.

A "temporary network configuration" refers to a SSID and password that is temporarily provided on a wireless network of, for example, a control unit located within a property, a network router that provides access to a local area network (LAN), or a mobile device such as a smart phone, a tablet computing device, or a smart wearable device. As described in more detail below, in some instances, the temporary network configuration can be adjusted to match the default network configuration so that the control unit can establish a temporary network connection with the wireless device for a specified period of time.

A "local network configuration" refers to a SSID and password that is associated with a WLAN within a property. For example, a "local network configuration" may refer to a user-defined SSID and password for a wireless network provided through a network access point. In this regard, during the wireless provisioning techniques described through, the network configuration of the wireless device is adjusted from a default network configuration to a local network configuration to enable the wireless device to connected to the WLAN with minimal input from the user.

FIG. 1A illustrates an example of a system 100A that is capable of provisioning a wireless network connection. The system 100A may include a control unit 110, a wireless device 120, appliances 132, sensors 134, a user device 140, and an application server 150 connected over a network 105. The various components of the system 100A may be located in and associated with a property 101. The user 102 can be an occupant of the property 101 or a property administrator of the property 101 (e.g., owner, landlord, manager, etc.).

In general, the system 100A provisions a network connection for a wireless device 120 that is to be installed within the property 101, or added as a new component to the system 100A. Initially, a wireless device 120 is associated with a specific MAC address and a default network configuration (e.g., a service set identifier (SSID) and an associated password). The default network configuration can be generated based on using a hashing technique to generate unique alphanumeric values for the default SSID and password based on the numbers and characters included in the MAC address, or other schemes discussed in detail below.

The default network configuration can be generated and assigned to the wireless device 120 at any point prior to the wireless device 120 entering into the property 101. For example, the default network configuration may be generated for the wireless device 120 during the manufacturing process. In other examples, the default network configuration may be generated as an after-market feature by an entity other than the device manufacturer (e.g., a service provider associated with the system 100A). In other examples, the default network configuration may be generated when the device first boots and/or is factory reset.

In various implementations, the default network configuration for the wireless device 120 can be generated using different techniques and at different time points of the manufacturing and delivery process. For example, in some implementations, the default network configuration is generated based on the MAC address of the wireless device 120 during manufacturing. In other implementations, the default network configuration is generated based on the MAC address of the wireless device 120 when the wireless device 120 is initially booted (e.g., after delivery to the property 101). In some other implementations, the default configuration is generated based on other device-specific identifiers aside from the MAC address (e.g., a device serial number). In such implementations, the device-specific identifiers are captured and associated with the MAC address of the wireless device 120 during manufacturing. In some other implementations, the default network configuration for the wireless device 120 is randomly generated and captured during manufacturing of the wireless device. For example, the default network configuration can be a randomly generated issued token that is assigned to a particular wireless device during manufacturing.

Once the default network configuration is generated for the wireless device 120, this information may be obtained by the application server 150 and stored within a customer account associated with the user 102. For example, once the user 102 places an order for the wireless device 120, an order identifier can be used to obtain the default network configuration for the particular wireless device ordered by the user 102. As illustrated, the customer account data 152 can also include network configuration for the network 105 (e.g., local SSID and password) and information associated with the wireless device 120 (e.g., MAC address, default SSID, default password).

When the wireless device 120 is received at the property 101, the application server 150 initially exchanges network configuration data with the control unit 110. As described in more detail below, a network hosted by the control unit 110 can be configured to provide a temporary network configuration 112 (e.g., temporary SSID and password), which is used to establish a temporary network connection with the wireless device 120 through the network of the control unit 110. In some instances, the temporary network configuration 112 of the network of the control unit 110 is set to correspond with the default network configuration of the wireless device 120 in order to enable establish the temporary network connection. The temporary network connection can then be used to transmit a reconfiguration instruction to adjust the default network configuration of the wireless device 120 to the local network configuration of the network 105, which enables the wireless device 120 to connect to the network 105.

Referring to the components of the system 100A, the network 105 may be configured to enable data communications between devices connected to the network 105. For example, the network 105 may be configured to enable exchange of data communications between the control unit 110, the wireless device 120, the appliances 132, the sensors 134, the user device 140, and the application server 150.

The network 105 may include, for example, Local Area Networks (LANs), for example, Wi-Fi, analog or digital wired and wireless telephone networks, for example, a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data.

The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may also be a wireless network, a broadband network, or a combination of networks including a wireless network and a broadband network.

The control unit 110 may include a controller and a network module. The controller may be configured to control a system, for example, a security system associated with a property that includes the control unit 110. In some examples, the controller may include a processor or other control circuitry configured to execute instructions of a program that controls operation of a security system. In these examples, the controller may be configured to receive input from sensors, detectors, or other devices associated with the security system and control operation of components of the security system, for example, a camera, a motion sensor, an alarm detector, or other devices associated with the property, for example, an appliance, lights, etc. For example, the controller may be configured to control operation of the network module included in the control unit 110.

The controller may also include a wireless network interface controller (WNIC). The WNIC may be capable of detecting Wi-Fi probes transmitted by nearby devices. For instance, a wireless device 120 in range of the control unit 110 may initially transmit a probe request on all channels to search for nearby access points. The control unit 110 may detect these probe requests, which are part of the Wi-Fi management frame. In response to detecting the probe requests, the control unit 110 may identify data included in the probe requests such as the date or timestamp, the radio frequency (e.g., 2412 Megahertz), the received signal strength indication (RSSI) (e.g., −63 decibels), the basic service set identifier (BSSID), the destination address, the source address (e.g., the MAC address of the Wi-Fi device), service set identifier (SSID), or supported data rates (e.g., 1.0 Megabit, 2.0 Megabit, etc.). The control unit 110 may then use the identified data to establish a temporary network connection with the wireless device 120.

The network module may be a communication device configured to exchange communications over the network 105. The network module may be a wireless communication module configured to exchange wireless communications over the network 105. For example, the network module may be a wireless communication device configured to exchange communications over a wireless data channel. In this example, the network module may transmit user location data within or external to the property, environmental data from the property, for example, indoors at the property or outdoors at the property, or other data over a wireless data channel. The wireless communication device may include one or more GSM modules, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module also may be a wired communication module configured to exchange communications over the network 105 using a wired connection. For instance, the network module may be a modem, a network interface card, or another type of network interface device. The network module may be an Ethernet network card configured to enable the control unit 110 to communicate over a local area network and/or the Internet. The network module also may be a voice band modem configured to enable the alarm panel to communicate over the telephone lines of Plain Old Telephone Systems (POTS). In some implementations, the alarm panel may be a broadband or cellular gateway where the network module may enable the control unit 110 to communicate over the network 105.

In some implementations, the control unit 110 may operate as a wireless access point with switch ports to monitor Wi-Fi probes transmitted by a nearby wireless device 120 to be installed within the property 101. In such implementations, the control unit 110 may be assigned a DHCP IP address from either the DHCP server running on the router of the network 105, or through other means independent of the network 105 (e.g., a secondary cellular network connection). In response, the wireless device 120 may be associated with the service set identifier (SSID) of the control unit 110. In other instances, the wireless device 120 may be plugged into the switch ports on the control unit 110. As described in more detail below, the control unit 110 may be configured to host one or more access points that can be used to establish a temporary network connection with the wireless device 120.

In some implementations, the control unit 110 may be used to detect Wi-Fi devices that have repeatedly tried to unsuccessfully connect to an SSID. For example, in response to detecting the unsuccessful connection attempts using the Wi-Fi sniffing technique, the control unit 110 may transmit a signal to the control unit 110 and/or application server 150 to provide an alert and log an event for a potential security breach that includes the MAC address of the Wi-Fi device transmitting the connection request or other data included within the probe request frame.

The hardware of the control unit 110 may include various configurations as described in more detail for the figures below. In one example, the control unit 110 may include a Wi-Fi access point (AP) interface with a Wi-Fi chipset and driver that allows for concurrent AP and (Radio Frequency Monitor (RFMON) operations. In another example, the control unit 110 may include a Wi-Fi AP interface and an additional Wi-Fi interface where one interface passively gathers Wi-Fi node information and the other interface functions as a Wi-Fi AP with a service set identifier (SSID) for wireless devices 120 to be installed within the property 101.

The system 100A that may include the control unit 110, which may communicate with the wireless device 120, the appliances 132, the sensors 134, the user device 140, and the application server 150 to monitor various operations related to functions of the wireless device 130. The control unit 110 may monitor the operation of the wireless device 120, the appliances 132, the sensors 134, the user device 140, and the application server 150. As an example, the control unit 110 may receive Wi-Fi probes from a new wireless device 120 to be connected over the network 105. In response receiving the Wi-Fi probe, the control unit 110 may establish a temporary network connection with the wireless device 120 with the control unit 110 acting as a network access point. The wireless device 120 can then be reconfigured to establish a network connection using the network credentials of the network 105.

In another example, in response to receiving a Wi-Fi probe from the wireless device 120, the control unit 110 may transmit a notification to the user device 140 in order to determine the authenticity of the received Wi-Fi probe. For instance, the control unit 110 may request a confirmation to verify that the received Wi-Fi probe is from the wireless device 120. Further examples of such security features are described in more detail below.

The wireless device 120 may be any type of network-enabled electronic device that is capable to exchanging data communications over the network 105. As referenced throughout this specification, the wireless device 120 can be an electronic device that is to be installed in the property 101 and/or added to the system 100A, and is therefore not initially associated with the network 105 (e.g., not configured to detect the network credentials of the network 105). In some implementations, the wireless device 120 is a Wi-Fi-enabled camera, e.g., a security camera that is installed within the property 101 and configured to exchange communications with other devices connected over network 105.

The wireless device 120 is initially configured with a predetermined MAC address that is associated with a temporary SSID and password as its default settings. This configuration takes place prior to the initiation of the Wi-Fi provisioning techniques described throughout (e.g., during manufacturing of the wireless device 120, or afterwards by a service provider associated with the system 100A, or during the boot sequence). In addition, the configuration for the wireless device 120 is associated with the user 102's customer account on the application server 150, and provided to the control unit 110. In this regard, once the user 102 receives the wireless device 120, data communications between the control unit 110, the application server 150, and the wireless device 120 can be used to provision a wireless network connection to the wireless device 120 without any manual intervention from the user 102. Greater descriptions related to this process are provided in the figures below.

The appliances 132 may be home automation devices connected to the network 105 that are configured to exchange electronic communications with other devices of the system 100. The appliances 132 may include, for example, connected kitchen appliances, controllable light sources, safety and security devices, energy management devices, and/or other types of electronic devices capable of exchanging electronic communications over the network 105. In some instances, the appliances 132 may periodically transmit information and/or generated data to the wireless device 120 such that the wireless device 120 can control the operation of the appliances 132 based on the exchanged communications. For example, the wireless device 120 may operate one or more of the appliances 132 based on a fixed schedule specified by the user. In another example, the wireless device 120 may enable or disable one or more of the appliances 132 based on received sensor data from the sensors 134.

The sensors 134 may include one or more of a contact sensor, a motion sensor, a glass break sensor, an occupancy sensor, or any other type of sensor that can be included in an alarm or security system. The sensors 134 may also include an environmental sensor, such as a temperature sensor, a water sensor, a rain sensor, a wind sensor, a light sensor, a smoke detector, a carbon monoxide detector, an air quality sensor, etc. The sensors 134 may further include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 134 may include a radio-frequency identification (RFID) sensor that identifies a particular article that includes a pre-assigned RFID tag.

In some implementations, the sensors 134 may include one or more cameras. The cameras may be video/photographic cameras or other type of optical sensing devices configured to capture images. For instance, the cameras may be configured to capture images of an area within a building monitored by the wireless device 120. The cameras may be configured to capture single, static images of the area and also video images of the area in which multiple images of the area are captured at a relatively high frequency (e.g., thirty images per second). The cameras may be controlled based on commands received from the wireless device 120.

The user device 140 may be any type of personal electronic computing device that is associated with the user 102. For example, the user device 140 may be one or more of a cellular telephone, smartphone, a tablet computing device, a laptop computing device, a desktop computing device, a wearable device, or any other type of network-enabled electronic device. The user device 140 can also execute one or more native applications.

In some implementations, the user device 140 may communicate with and receive data associated with the system 100A from the control unit 110. For instance, the user device 140 may communicate with the control unit 110 using various local wireless protocols, such as Wi-Fi, Bluetooth, Z-Wave, ZigBee, Home Plug, HPAV, HPAV2, G.hn (Ethernet over power line), or wired protocols such as Ethernet, USB, and other wired protocols based on the RS232, RS485, and/or RS422 standards. The user device 140 may also connect locally to the system 100A and its sensors and other devices over the network 105. The local connection may improve the speed of communications because communicating through the network 105 with a remote server, for example, the application server 150.

In some implementations, the user device 140 may receive data associated with the system 100A through the network 105. The user device 140 may receive the data from the control unit 110 through the network 105 or the application server 150 may relay data received from the control unit 110 to the user device 140 through the network 105. In this regard, the application server 150 may facilitate communications between the user device 140 and the control unit 110.

The user device 140 include a native application. The native application refers to a software/firmware program running on the user device 140 that enables various features. For instance, the user device 140 may load or install the native application based on data received over a network 105 or data received from local media. The native monitoring application may run on mobile devices' platforms, such as Apple iOS, iPhone, iPod touch, Blackberry, Google Android, Windows Mobile, etc.

The native application of the user device 140 identifies a geographic location associated with the user device 140 and communicates information identifying the geographic location. For example, the user device 140 having the native application may determine a geographic location of the user device 140 using GPS capabilities, and may communicate data identifying the geographic location to the application server 150. In some instances, the native application may check the location of the user device 140 periodically and may detect when the user 102 is presently located inside or outside the property 101.

The application server 150 may be a remote monitoring station for a service provider such as an internet service provider, an alarm security provider, or an internet security provider that receives data transmissions such as, for example, internet activity, Wi-Fi presence, internet connectivity, monitoring system information. The application server 150 may track connection events to the network 105 transmitted from devices located within the property 101. For example, in some instances, the application server 150 may be configured to exchange communications with a local installation client connected to the network 105 that generates the activity reports and transmits the activity reports to the application server 150. In some implementations, the application server 150 may be configured to transmit cloud-based configuration settings to the control unit 110 to adjust the operations of the control unit 110.

The system 100A as described above may include various optional features across different implementations. In some implementations, the system 100A may additionally or alternatively include satellite passive Wi-Fi probe request sniffing devices located within a property that are configured to detect Wi-Fi probe requests and transmit the detected Wi-Fi probe requests to the control unit 110. For example, the satellite passive Wi-Fi passive probe requesting sniffing devices may transmit the information to the control unit 110 using various wireless technologies such as, for example, Wi-Fi direct, Bluetooth, Power line communication (PLC), HPAV, G.gn, Ethernet, etc.

Figure 1B:
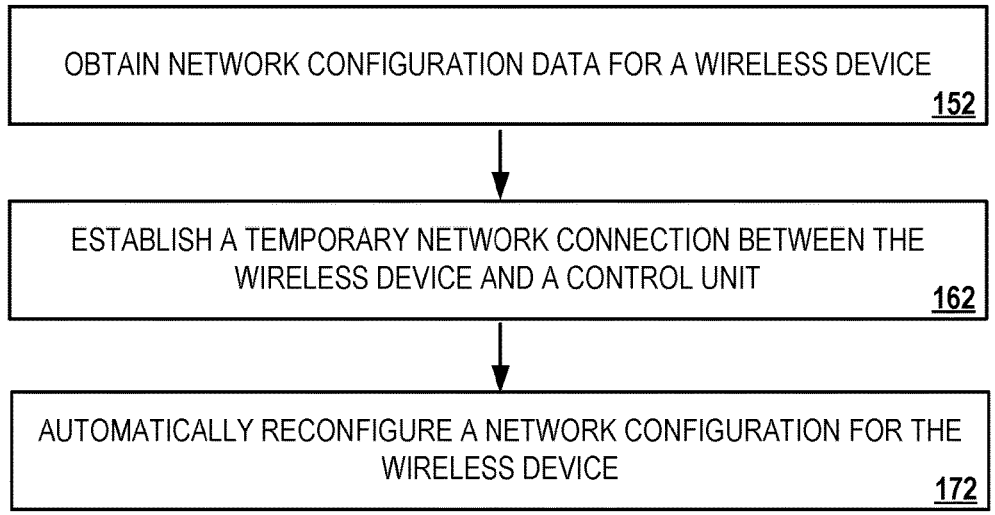
FIG. 1B illustrates an example of a process for provisioning a wireless network connection.

FIG. 1B illustrates an example of a process 100B for provisioning a wireless network connection. Briefly, the process 100B can include obtaining network configuration data for a wireless device (152), establishing a temporary network connection between the wireless device and a control unit (162), and reconfiguring a network configuration for the wireless device (172). The process 100B is described as being performed by a system comprising one or more computers or subsystems, for example, the system 100A shown in FIG. 1A.

In more detail, the process 100B can include obtaining network configuration data for a wireless device (152). The control unit 110 may obtain network configuration data for the wireless device 120 from the application server 150. The network configuration data can include a MAC address for the wireless device 120, and a default SSID and password associated with the wireless device 120. In some implementations, the network configuration may include instructions/protocols related to the configuration of the wireless access point provided by the control unit 110.

The process 100B can include establishing a temporary network connection between the wireless device and a control unit (162). The control unit 110 may initially provide a wireless access point based on the network configuration data obtained from the application server 150. The access point may be configured to detect Wi-Fi probes transmitted by nearby devices such as the wireless device 120. The Wi-Fi probe transmitted by the wireless device 120 may include its default network configuration information 122 (e.g., MAC address and default SSID). The Wi-Fi probe is then detected by the control unit 110 and then used to establish a temporary network connection with the wireless device 120 using its default SSID and default password as a temporary network configuration.

The process 100B can include reconfiguring a network configuration for the wireless device (172). After the control unit 110 has established a temporary network connection with the wireless device 120 over its wireless access point, the control unit 110 may transmit network configuration data to the wireless device 120 over the temporary network connection. The transmitted configuration data can then be used to adjust the default SSID and password of the wireless device 120 to the local SSID and local password associated with the network 105. Once the wireless device 120 has been reconfigured, it can then connect to the network 105 using the local SSID and the local password.

Figure 2A:
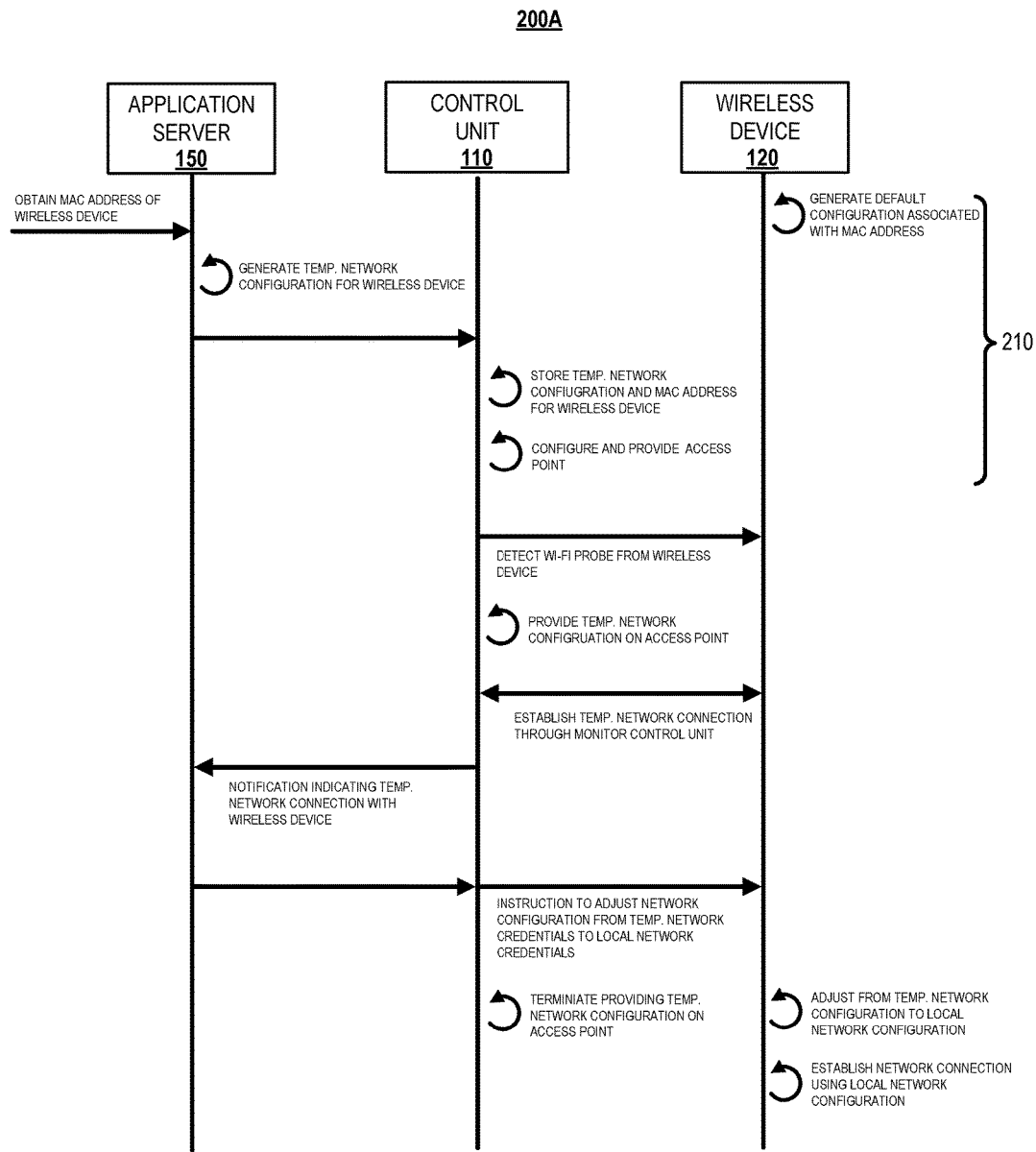
FIGS. 2A-2D illustrate examples of techniques for using a temporary wireless access point of a control unit to provision a wireless network connection.
Figure 2B:
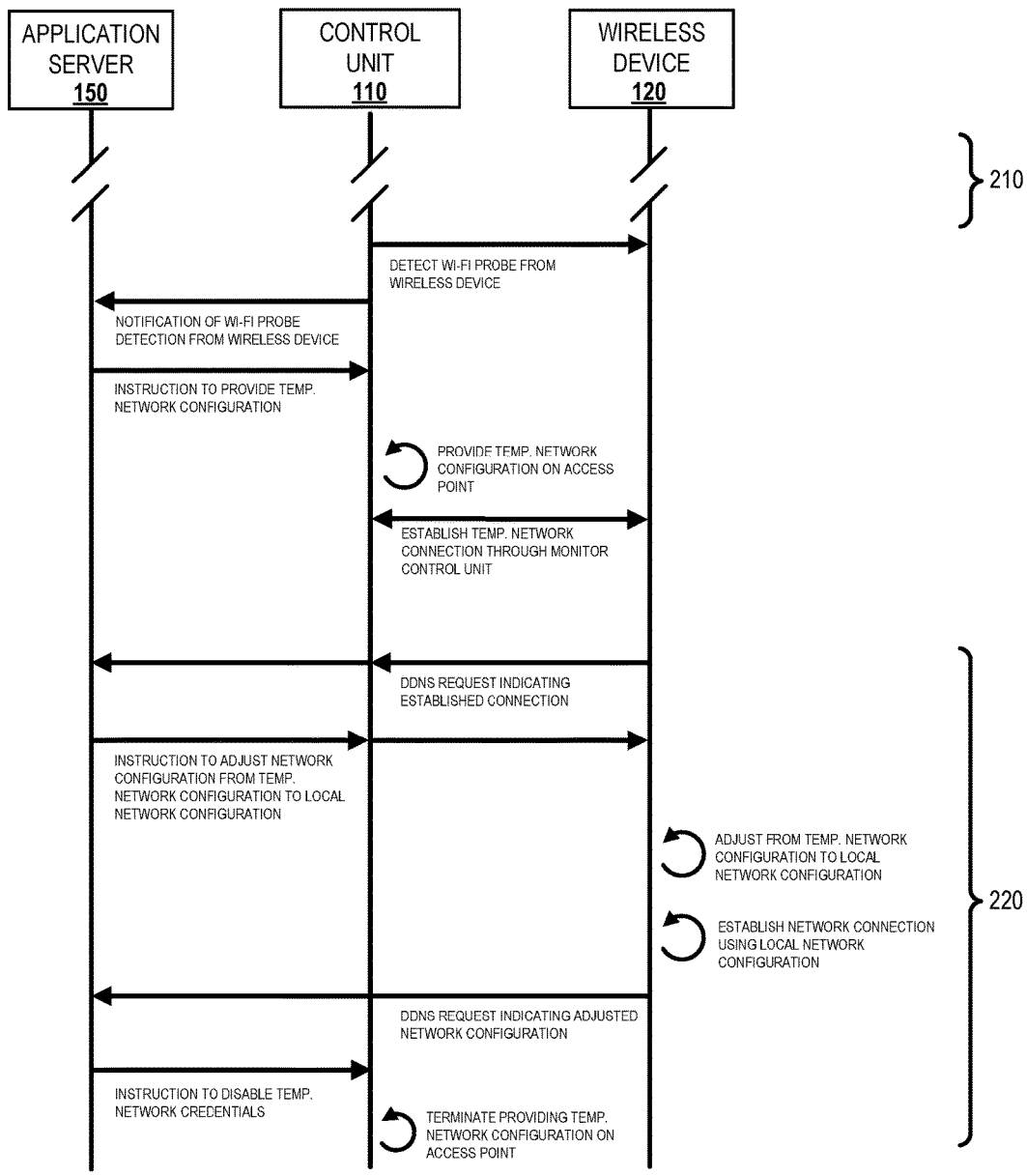
Figure 2C:
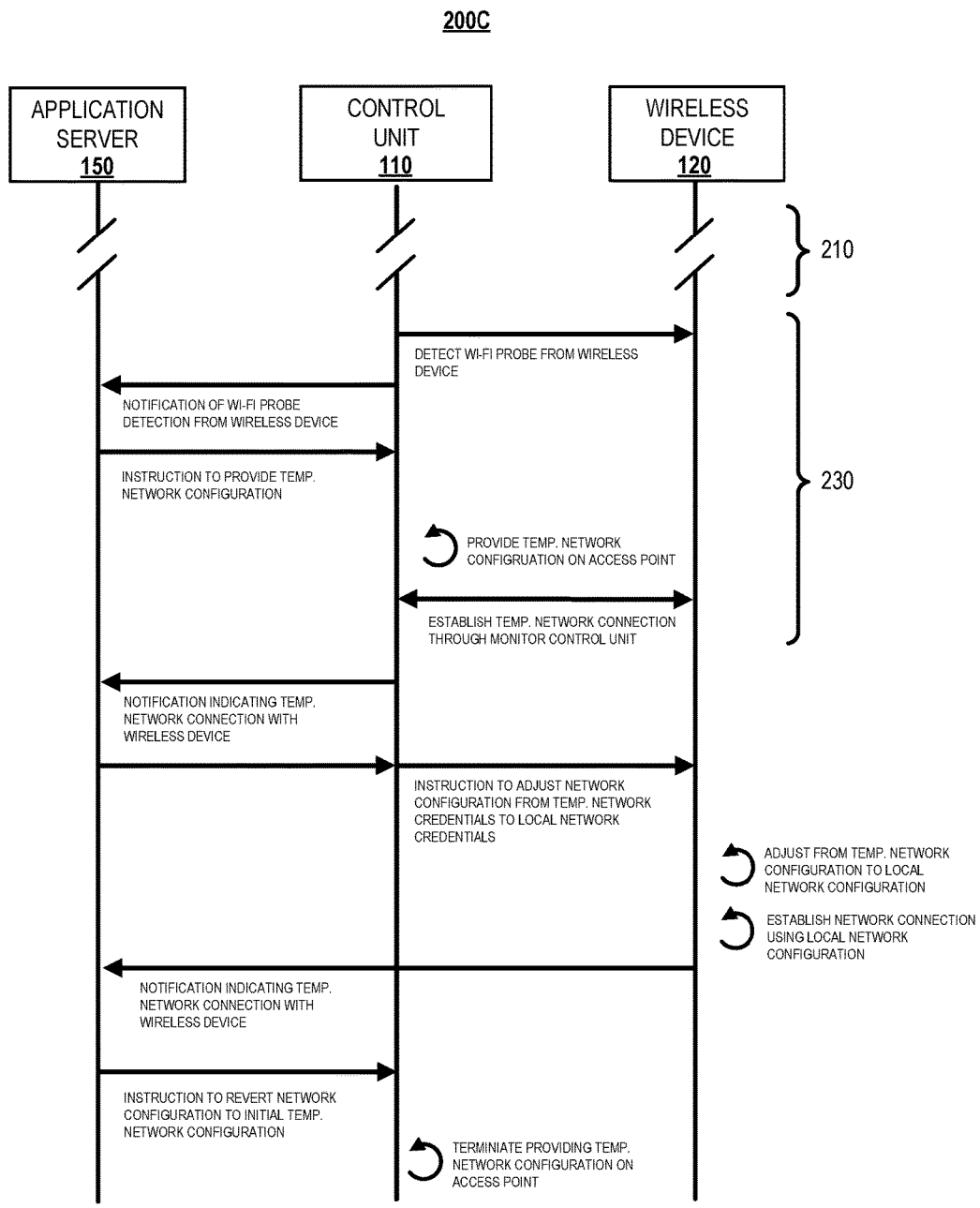
Figure 2D:
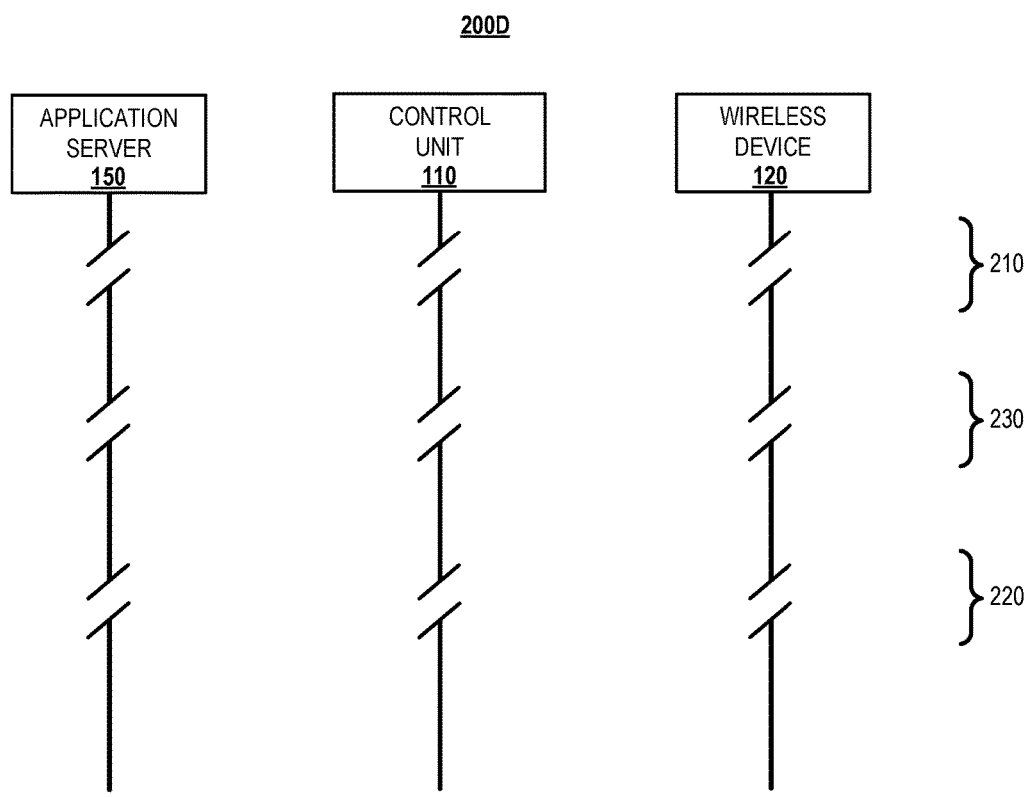

FIGS. 2A-2D illustrate examples of implementations for provisioning a wireless network connection using an access point of the control unit 110 after detecting a Wi-Fi probe transmitted from the wireless device 120. FIG. 2A illustrates an example of an implementation where network reconfiguration is controlled by the control unit 110. FIG. 2B illustrates an example of an implementation where network reconfiguration is controlled by the application server 150. FIG. 2C illustrates an example of an implementation where the access point of the control unit 110 only supports providing a single SSID and network reconfiguration is controlled by the application server 150. FIG. 2D illustrates an example of an implementation where the access point of the control unit 110 only supports providing a single SSID and network configuration is controlled by the control unit 110.

Referring initially to FIG. 2A, an example of an implementation 200A where network reconfiguration is controlled by the control unit 110 is illustrated. The wireless device 120 is initially configured such that its MAC address is associated with a default network configuration (e.g., default SSID and default password) as described above. The default SSID and default password can be generated by applying hashing techniques to numbers and characters included in the MAC address to generate unique alphanumeric values for each of the default SSID and default password, generated by applying hashing techniques to a device serial number, or generated randomly during manufacturing and communicated by the manufacturer to the application server 150. Once generated, data indicating the default network configuration for the wireless device 120 is obtained by the application server 150. The obtained data can then be stored in the user's account as illustrated in customer account data 152 of FIG. 1A.

In some implementations, the default SSID and default password can be generated at a factory where the wireless device 120 is manufactured. For example, the default SSID and default password can be randomly generated based on a specified factory identifier and assigned to all devices that are manufactured at a particular factory. Alternatively, the default SSID and default password may also be generated using a specified numbering technique that is specific to the particular factory. In such implementations, the default SSID and default password may be assigned to the wireless device 120 once it has been manufactured at the factory. The assigned default SSID and default password can then be transmitted to the application server 150 based on shipment data associated with the factory (e.g., in a shipment file that includes a list of MAC addresses of wireless devices that have been shipped from the factory).

The application server 150 then generates temporary network configuration using the default SSID and password associated with the MAC address of the wireless device 120. The application server 150 then transmits an instruction to the control unit 110 to configure an W-Fi access point of the control unit 110 using the temporary network configuration. In response, the control unit 110 stores the temporary network configuration and the MAC address for the wireless device 120, and then initiates an access point configuration using the temporary network configuration.

For simplicity, the entire process between generating a default network configuration for the wireless device 120 and the control unit 110 initiating access point configuration using the temporary network configuration, as described above, will be referred to as process 210 in corresponding descriptions for other implementations that use substantially identical operations.

The access point of the control unit 110 then waits to listens for Wi-Fi probe transmitted from the MAC address of the wireless device 120. Once the control unit 110 detects the Wi-Fi probe transmitted from the wireless device 120, the control unit 110 then provides the temporary SSID and password on the access point. As described above, in this example, the temporary SSID and password corresponds to the default SSID and password for the wireless device 120, which then allows the wireless device 120 to establish a temporary network connection through the access point of the control unit 110.

After establishing a temporary network connection with the wireless device 120, the control unit 110 transmits a notification indicating the established temporary network connection to the application server 150. In response, the application server 150 transmits an instruction to the control unit 110 to adjust the network configuration of the wireless device 120 from the temporary network configuration to the local network configuration of the network 105. The control unit 110 then routes the instruction to the wireless device 120 the control unit 110 through its access point.

The instruction received at the wireless device 120 causes the wireless device 120 to adjust its network configuration from the default SSID and password to the local SSID and password of the network 105, which then allows the wireless device 120 to connect to the network 105. In some implementations, the wireless device 120 connects to the network 105 through a permanent access point of the control unit 110 (e.g., an access point different from the temporary access point). Alternatively, in other implementations, the wireless device 120 connects through the network through an access point of a network device external to the control unit 110 (e.g., a wireless router associated with the network 105).

Once the instruction from the application server 150 is routed to the wireless device 120, the control unit 110 terminates the availability of the temporary SSID and password on its access point because it is no longer necessary to enable network connectivity for the wireless device 120.

Referring now to FIG. 2B, an example of an implementation 200B where network reconfiguration is controlled by the application server 150 is illustrated. In this implementation, the wireless device 120, the control unit 110, and the application server 150 perform the same operations as the operations described above in process 210.

The access point of the control unit 110 then waits to listen for Wi-Fi probe transmitted from the MAC address of the wireless device 120. Once the control unit 110 detects a wireless probe transmitted by the wireless device 120, the control unit 110 then transmits a notification of the detected Wi-Fi probe to the application server 150. In response, the application server 150 generates an instruction that includes temporary network configuration information for the access point of the control unit 110. This instruction is generated based on the default network configuration associated with the MAC address of the wireless device 120 that is stored within the user's account. The generated instruction is then transmitted to control unit 110.

After receiving the instruction from the application server 150, the control unit 110 configures its access point to provide the temporary SSID and password as described above. The wireless device 120 then establishes a temporary network connection through the access point of the control unit 110.

After establishing the temporary network connection with the control unit 110, the wireless device 120, in this example, transmits a dynamic domain name system (DDNS) request to the application server 150 to identify an IP address of the wireless device 120 and trigger an adjustment to the network configuration of the wireless device 120. In response, the application server 150 generates an instruction to reconfigure the network configuration of the wireless device 120 from the temporary SSID and password to the local SSID and password of the network 105. The instruction is then routed to the wireless device 120 through the control unit 110. In other examples, other types of automatic communication schemes and/or protocols can be used between the control unit 110, the wireless device 120, and/or the application server 150, as discussed below.

As described above, the instruction received at the wireless device 120 causes the wireless device 120 to adjust its network configuration from the default SSID and password to the local SSID and password of the network 105, which then allows the wireless device 120 to connect to the network 105. The wireless device 120 then transmits a second DDNS request to the application server 150 indicating that it has established a connection to the network 105. In response, the application server 150 then generates and transmits an instruction for the control unit 110 to terminate the availability of the temporary SSID and password on its access point.

For simplicity, the entire process between the wireless device 120 transmitting the first DDNS request to the application server 150, and the control unit 110 terminating the availability of the temporary SSID and password on its access point, as described above, will be referred to as process 220 in corresponding descriptions for other implementations that use substantially identical operations.

Referring now to FIG. 2C illustrates an example of an implementation where the access point of the control unit 110 only supports providing a single SSID and network reconfiguration is controlled by the application server 150 is illustrated. In this implementation, the wireless device 120, the control unit 110, and the application server 150 initially perform the same operations as the operations described above in process 210.

The access point of the control unit 110 then waits to listens for Wi-Fi probe transmitted from the MAC address of the wireless device 120. Once the control unit 110 detects a wireless probe transmitted by the wireless device 120, the control unit 110 transmits a notification of the detected Wi-Fi probe to the application server 150. In response, the application server 150 generates an instruction that includes temporary network configuration information for the access point of the control unit 110. This instruction is generated based on the default network configuration associated with the MAC address of the wireless device 120 that is stored within the user's account. The generated instruction is then transmitted to control unit 110.

After receiving the instruction from the application server 150, the control unit 110 configures its access point to provide the temporary SSID and password as described above. The wireless device 120 then establishes a network connection through the access point of the control unit 110.

For simplicity, the entire process between the access point of the control unit 110 listening for a Wi-Fi probe transmitted from the MAC address of the wireless device 120, and the wireless device 120 establishing a temporary network connection through the access point of the control unit, as described above, will be referred to as process 230 in corresponding descriptions for other implementations that use substantially identical operations.

After establishing a temporary network connection with the wireless device 120, the control unit 110 transmits a notification indicating the established temporary network connection to the application server 150. In response, the application server 150 transmits an instruction to the control unit 110 to adjust the network configuration of the wireless device 120 from the temporary network configuration to the local network configuration of the network 105. The control unit 110 then routes the instruction to the wireless device 120.

The instruction received at the wireless device 120 causes the wireless device 120 to adjust its network configuration from the default SSID and password to the local SSID and password of the network 105, which then allows the wireless device 120 to connect to the network 105.

The wireless device 120 then transmits a notification to the application server 150 indicating that it has established a connection to the network 105. In response, the application server 150 then generates and transmits an instruction for the control unit 110 to revert the network configuration of its access point from the temporary SSID and password to the original SSID and password of the access point. In this implementation, because the control unit 110 is only capable of providing a single SSID and password combination at any instance, the network configuration of the access point is re-initialized after each wireless provisioning process.

Referring now to FIG. 2D, an example of an implementation where the access point of the control unit 110 only supports providing a single SSID and network configuration is controlled by the control unit 110 is illustrated. In this implementation, the wireless device 120, the control unit 110, and the application server 150 perform the same operations as the operations described above in processes 210, 230, and 230. The application server 150 obtains the MAC address of the wireless device 120. Using that MAC, the application server 150 determines a default SSID and password. Separately, the wireless device 120 is configured to use its MAC to compute the same default SSID and password. As described above, in some implementations, the wireless device 120 may be assigned a default SSID and default password at the time of manufacturing based on a factory where it was manufactured. The application server 150 sends the MAC address and the default SSID and password to the control unit 110 that is acting as an access point. The access point will listen for Wi-Fi probes from the MAC address of the wireless device 120. When the probe is heard, the application server 150 issues an instruction to change the SSID and password that is being provided by the access point to match the SSID and the password that the wireless device 120 will connect to. The wireless device 120 can then connect to the access point. After connecting to the access point, the wireless device 120 sends a DDNS request to the application server 150. The application server 150 then sends a command to the wireless device 120 to switch its SSID and password to the original SSID of the access point. The application server 150 may wait for a second DDNS request from the wireless device 120 to confirm it is connected to the network 105.

Figure 3A:
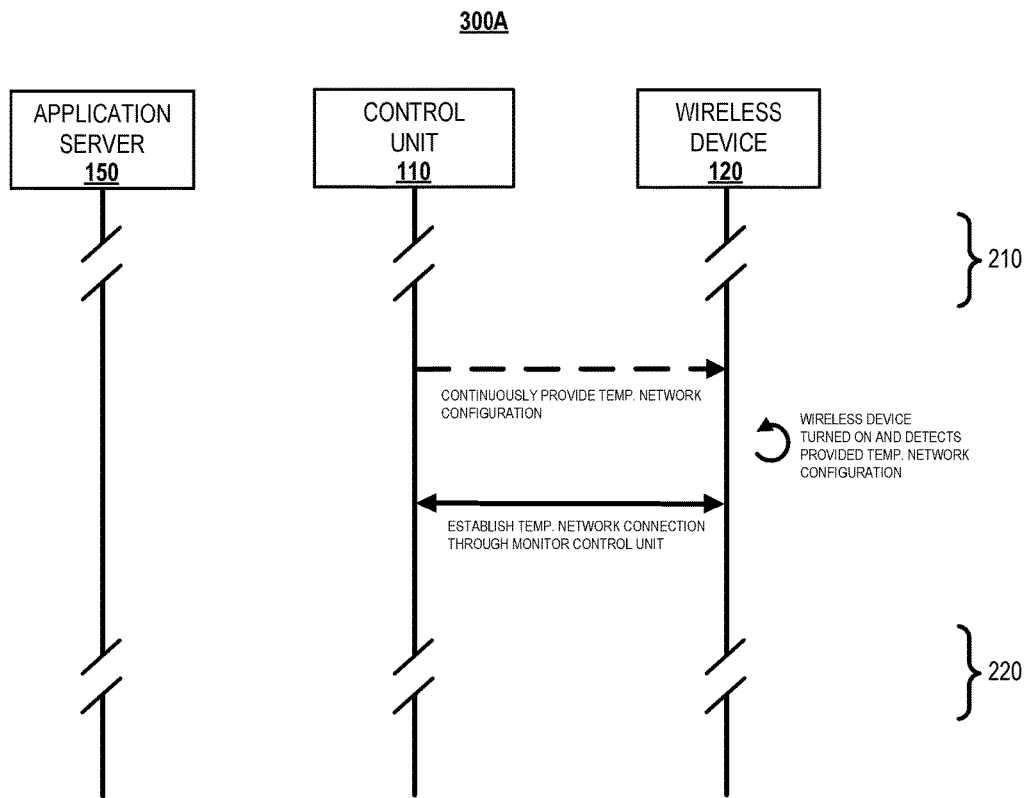
Figure 3B:
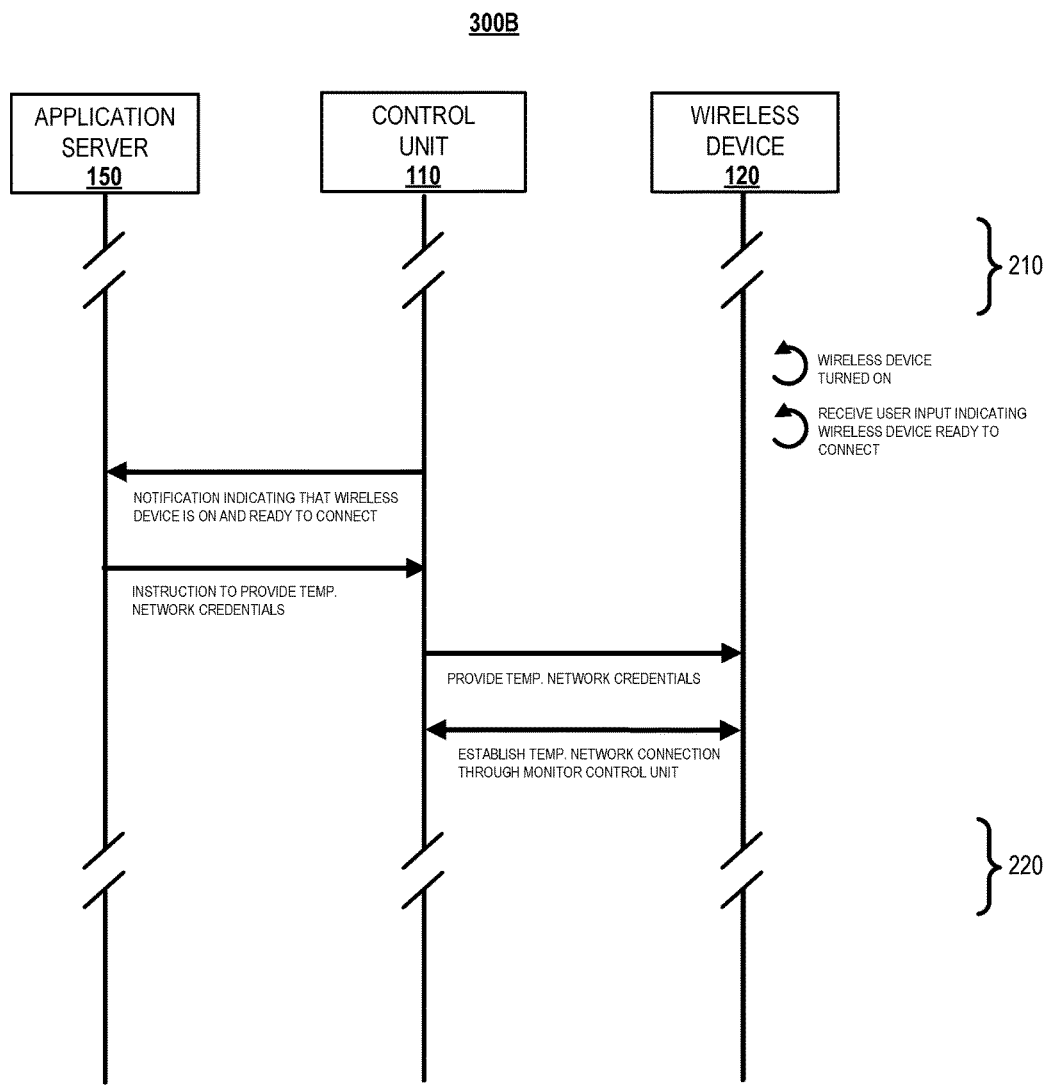

FIGS. 3A-3B illustrate examples of implementations for provisioning a wireless network connection using an access point of the control unit 110 after the wireless device 120 is turned on. Compared to the implementations described above in FIGS. 2A-2D, which relate to providing an access point with a temporary SSID and password in response to receiving a Wi-Fi probe, the implementations described in FIGS. 3A-3B involve using control units 110 that are unable to detect Wi-Fi probes transmitted by nearby wireless devices. As a result, these implementations provide wireless provisioning in relation to detecting when the wireless device 120 is turned on within the property 101.

Referring initially to FIG. 3A, an example of an implementation 300A where the access point of the control unit 110 is provided in response to an instruction from the application server 150 is illustrated. In this implementation, the wireless device 120, the control unit 110, and the application server 150 perform the same operations as the operations described above in process 210.

In addition, because the control unit 110 is unable to detect a Wi-Fi probe transmitted by the wireless device 120, in this implementation, the control unit 110 continuously provides the temporary SSID and password. Once the wireless device 120 is turned on within the property 101, the wireless device 120 detects the temporary SSID and password and establishes a temporary network connection through the access point of the control unit 110 in a manner similar to that described above.

After establishing the temporary network connection with the control unit 110, the wireless device 120, the control unit 110, and the application server 150 perform the same operations as the operations described above in process 220.

Referring now to FIG. 3B, an example of an implementation 300B where the access point of the control unit 110 is provided in response to user input on the user device 140 is illustrated. In this implementation, the wireless device 120, the control unit 110, and the application server 150 initially perform the same operations as the operations described above in process 210.

The control unit 110 then waits to receive data indicating a manual user input confirming that the wireless device 120 has been turned on and ready to establish a temporary connection through the access point of the control unit 110. For instance, the user 102 may be presented with a user interface that requests a confirmation that the wireless device 120 has been turned on.

The user interface may be provided on one or more devices associated with the system 100A. For example, in some implementations, the user interface is provided for output on the user device 140, and in response to receiving a user input indicating that the wireless device 120 is turned on, the user device 140 transmits a signal to the control unit 110. Additionally, or alternatively, in other implementations, the user interface is presented on one or more of the control unit 110, the wireless device 120, or any other device associated with the system 100A.

Once the control unit 110 receives user input data indicating that the wireless device 120 is turned on and ready to connect, the control unit 110 then transmits a notification of the received user input to the application server 150. In response, the application server 150 generates an instruction that includes temporary network configuration information for the access point of the control unit 110. This instruction is generated based on the default network configuration associated with the MAC address of the wireless device 120 that is stored within the user's account. The generated instruction is then transmitted to control unit 110.

After receiving the instruction from the application server 150, the control unit 110 configures its access point to provide the temporary SSID and password as described above. The wireless device 120 then establishes a network connection through the access point of the control unit 110.

After establishing the temporary network connection with the control unit 110, the wireless device 120, the control unit 110, and the application server 150 perform the same operations as the operations described above in process 220.

Figure 4A:
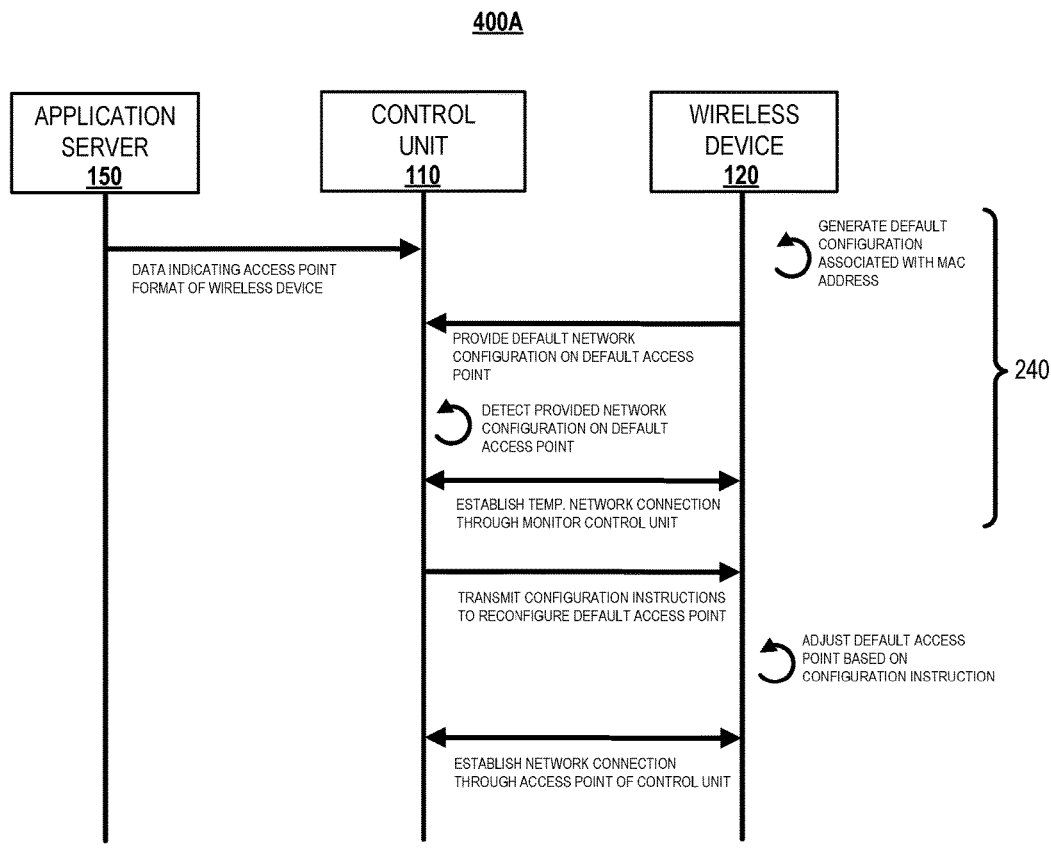
FIGS. 4A-4C illustrate examples of techniques for using a temporary wireless access point of a wireless device to provision a wireless network connection.
Figure 4B:
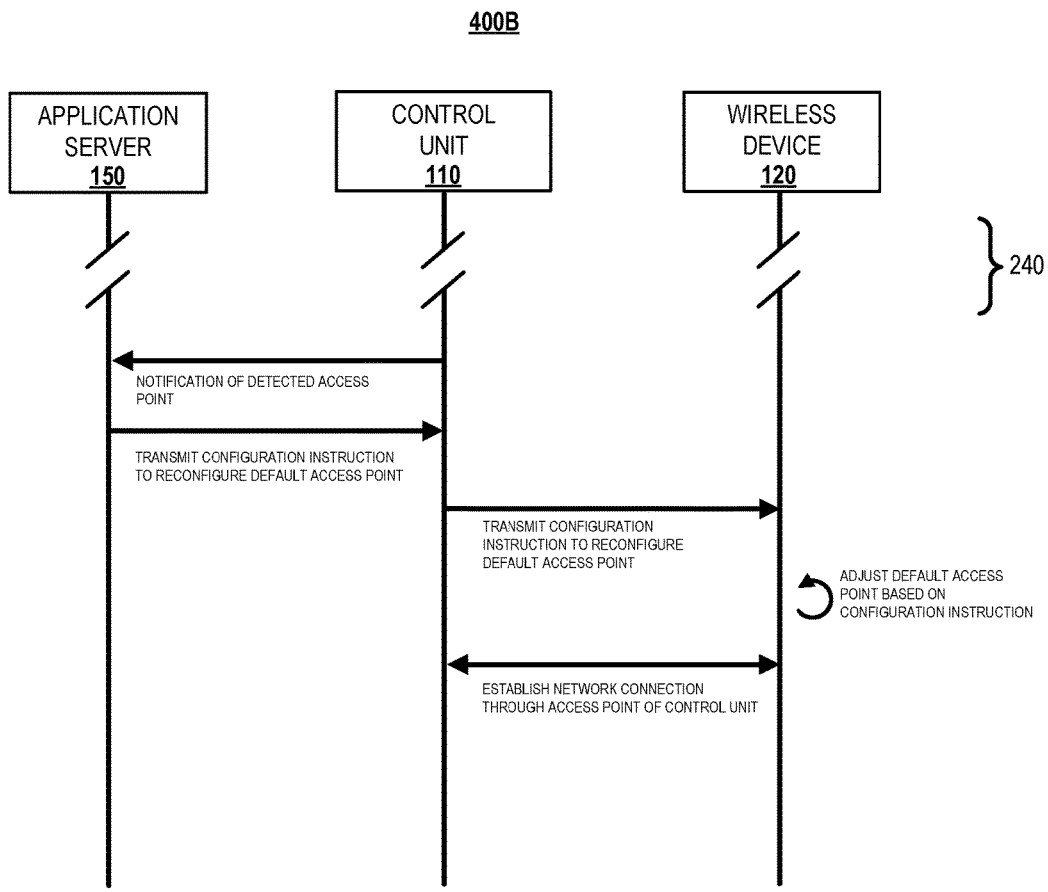
Figure 4C:
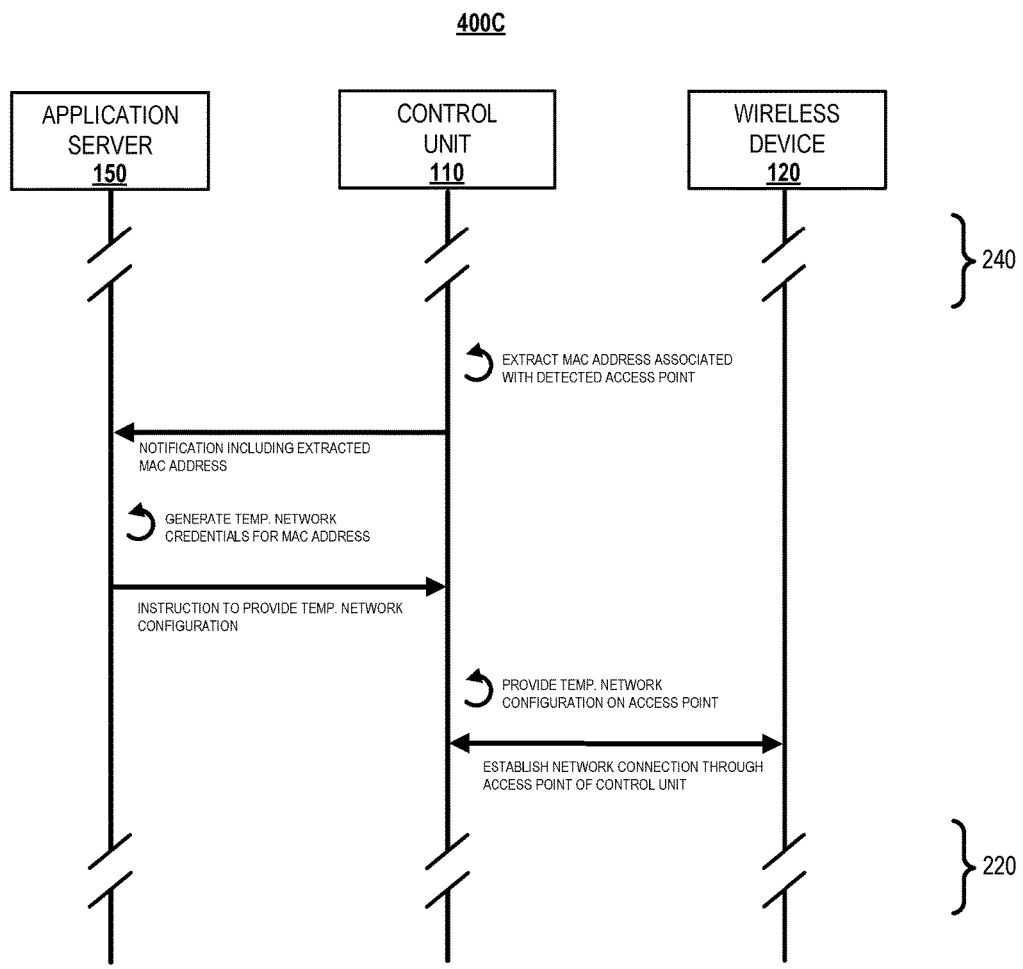

FIGS. 4A-4C illustrate examples of implementations for provisioning a wireless network connection using an access point of the wireless device 120. FIG. 4A illustrates an example of an implementation 400A where network reconfiguration is controlled by the control unit 110. FIG. 4B illustrates an example of an implementation 400B where network reconfiguration is controlled by the application server 150. FIG. 4C illustrates an example of an implementation 400C where the wireless device 120 is capable of alternating between providing a wireless access point and acting as a Wi-Fi client.

Compared to the implementations described above in FIGS. 2A-2D and 3A-3B where a wireless network connection is provisioned using an access point on the control unit 110, the implementations in FIGS. 4A-4C, a wireless network connection is provisioned using an access point on the wireless device 120.

Referring initially to FIG. 4A, an example of an implementation 400A where network reconfiguration is controlled by the control unit 110 is illustrated. As described above, the wireless device 120 is initially configured such that its MAC address is associated with a default network configuration (e.g., default SSID and default password). In addition, the wireless device 120 is also configured to provide a default access point in a specified format (e.g., using a particular IP address, radio channel, transmit power, SSID, beacon interval, etc.). Once configured, data indicating the default network configuration and the default access point format for the wireless device 120 is obtained by the application server 150. The obtained data can then be stored in the user's account as illustrated in customer account data 152 of FIG. 1.

The application server 150 then generates data indicating the default access point format of the wireless device 120 and transmits the generated data to the control unit 110. The control unit 110 then scans for the default access point format specified within the received data.

After detecting the default access point provided by the wireless device 120, the control unit 110 then establishes a temporary network connection through the access point of the wireless device 120.

For simplicity, the entire process between generating a default network configuration and a default access point for the wireless device 120, and establishing a temporary network connection between the control unit 110 and the wireless device 120 through the default access point of the wireless device 120, as described above, will be referred to as process 240 in corresponding descriptions for other implementations that use substantially identical operations.

After establishing a temporary network connection with the wireless device 120, the control unit 110 transmits a configuration instruction to adjust the default access point of the wireless device 120. The transmitted configuration instruction also includes a network configuration for the access point of the control unit 110.

The configuration instruction received at the wireless device 120 causes the wireless device 120 to reconfigure its access point such that the wireless device 120 can then establish a network connection through the access point of the control unit 110 using the access point information included in the configuration instruction. In some implementations, the network connection through the access point of the control unit 110 can be used to enable the wireless device 120 to connect to the network 105 through the access point of the control unit 110.

In other implementations, the established network connection between the wireless device 120 and control unit 110 may be used as a temporary network connection as described above. In such implementations, the network configuration of the wireless device 120 may be further adjusted using network reconfiguration techniques described above with respect to FIGS. 2A-2D.

Referring now to FIG. 4B, an example of an implementation 400B where network reconfiguration is controlled by the application server 150 is illustrated. In this implementation, the wireless device 120, the control unit 110, and the application server 150 initially perform the same operations as the operations described above in process 240.

Once the control unit 110 detects the default access point provided by the wireless device 120, the control unit 110 then transmits a notification of the detected default access point to the application server 150. In response, the application server 150 generates a configuration instruction to adjust the information used by the wireless device 120 as a wireless client. The generated configuration instruction also includes a network configuration for the access point of the control unit 110.

As described above, the configuration instruction received at the wireless device 120 causes the wireless device 120 to reconfigure its access point such that the wireless device 120 can then establish a network connection through the access point of the control unit 110 using the access point information included in the configuration instruction.

Referring now to FIG. 4C, an example of an implementation 400C where the wireless device 120 is capable of alternating between providing a wireless access point and acting as a Wi-Fi client is illustrated. In this implementation, the wireless device 120, the control unit 110, and the application server 150 initially perform the same operations as the operations described above in process 240.

Once the control unit 110 detects the default access point provided by the wireless device 120, the control unit 110 then extracts the MAC address associated with the default access point of the wireless device 120. The control unit then transmits a notification of the extracted MAC address to the application server 150. In response, the application server 150 generates an instruction that includes temporary network configuration information for the access point of the control unit 110. This instruction is generated based on the MAC address of the wireless device 120 extracted by the control unit 110. The generated instruction is then transmitted to control unit 110.

After receiving the instruction from the application server 150, the control unit 110 configures its access point to provide the temporary SSID and password as described above. The wireless device 120 then establishes a network connection through the access point of the control unit 110.

After establishing the temporary network connection with the control unit 110, the wireless device 120, the control unit 110, and the application server 150 perform the same operations as the operations described above in process 220.

Figure 5:
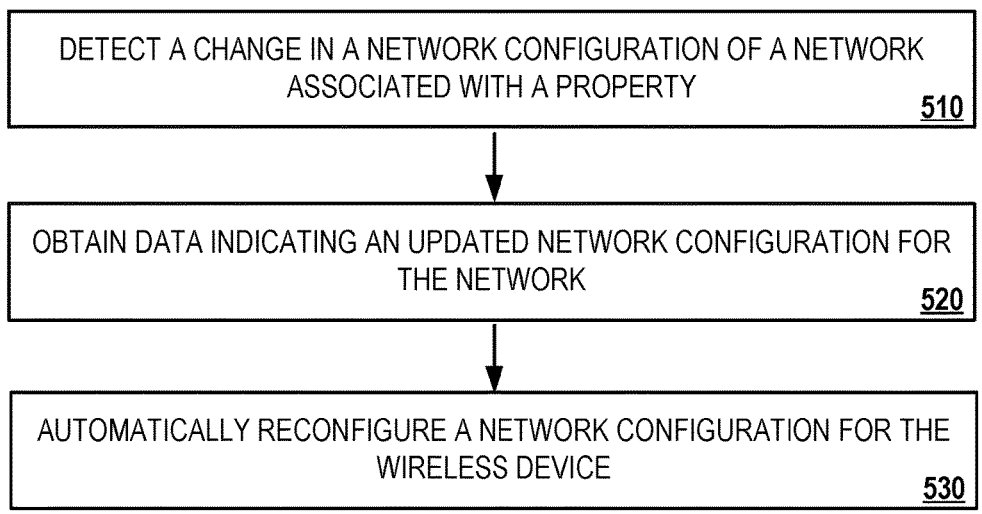
FIG. 5 illustrates an example of a process for restoring a wireless network connection in response a network configuration adjustment.

FIG. 5 illustrates an example of a process 500 for restoring a wireless network connection in response a network configuration adjustment. Briefly, the process 500 can include detecting a change in a network configuration of a network associated with a property (510), obtaining data indicating an updated network configuration for the network (520), and reconfiguring a network configuration for the wireless device (530).

In more detail, the process 500 can include detecting a change in a network configuration of a network associated with a property (510). The control unit 110 and/or the application server 150 initially detects a change in the SSID and/or the password of the network 105. As described in more detail below, the network configuration change can be detected based on, for example, performing network connectivity tests on network 105 to determine the devices that are currently capable of connecting to the network 105, obtaining a network connectivity report indicating that one or more devices of the system 100A have lost connection to the network 105, obtaining data indicating a change in a network configuration file for an access point of the network 105, among others.

The process 500 can include obtaining data indicating an updated network configuration for the network (520). The control unit 110 and/or the application server 150 may obtain user input data indicating a new network configuration for the network 105. As described in more detail below, in some implementations, after detecting a change in the network configuration of the network 105, the application server may transmit an instruction to one or more devices of the system 100A to provide a user interface to allow the user 102 to provide a user input indicating the new network configuration. The user interface may be presented, for example, through an associated application that runs on the user device 140, through a display associated with the control unit 110, or through any suitable webpage.

The process 500 can include reconfiguring a network configuration for the wireless device (530). The control unit 110 and/or the application server 150 may initially generate configuration instructions that enables an access point that provides the prior network configuration. In some implementations, an access point of the control unit 110 may be configured to provide the prior SSID and/or password of the network 105, which then enables the wireless device 120 to establish a temporary network connection through the access point of the control unit 110. A configuration instruction is then transmitted to the wireless device 120 through the temporary network connection to adjust the current network configuration the wireless device 120 to reflect the new network configuration of the network 105.

Additionally, or alternatively, in other implementations, the user device 140 may instead be used to provide the access point through which the wireless device 120 may establish a temporary network connection. For example, the control unit 110 and/or the application server 150 may enable the user device 140 to provide an access point through its cellular network connection. The access point of the user device 140 may be configured to provide the prior SSID and/or password of the network 105, which then enables the wireless device 120 to establish a temporary network connection through the access point of the user device 140. As described above, a configuration instruction is transmitted to the wireless device 120 through the temporary network connection to adjust the current network configuration the wireless device 120 to reflect the new network configuration of the network 105.

Figure 6:
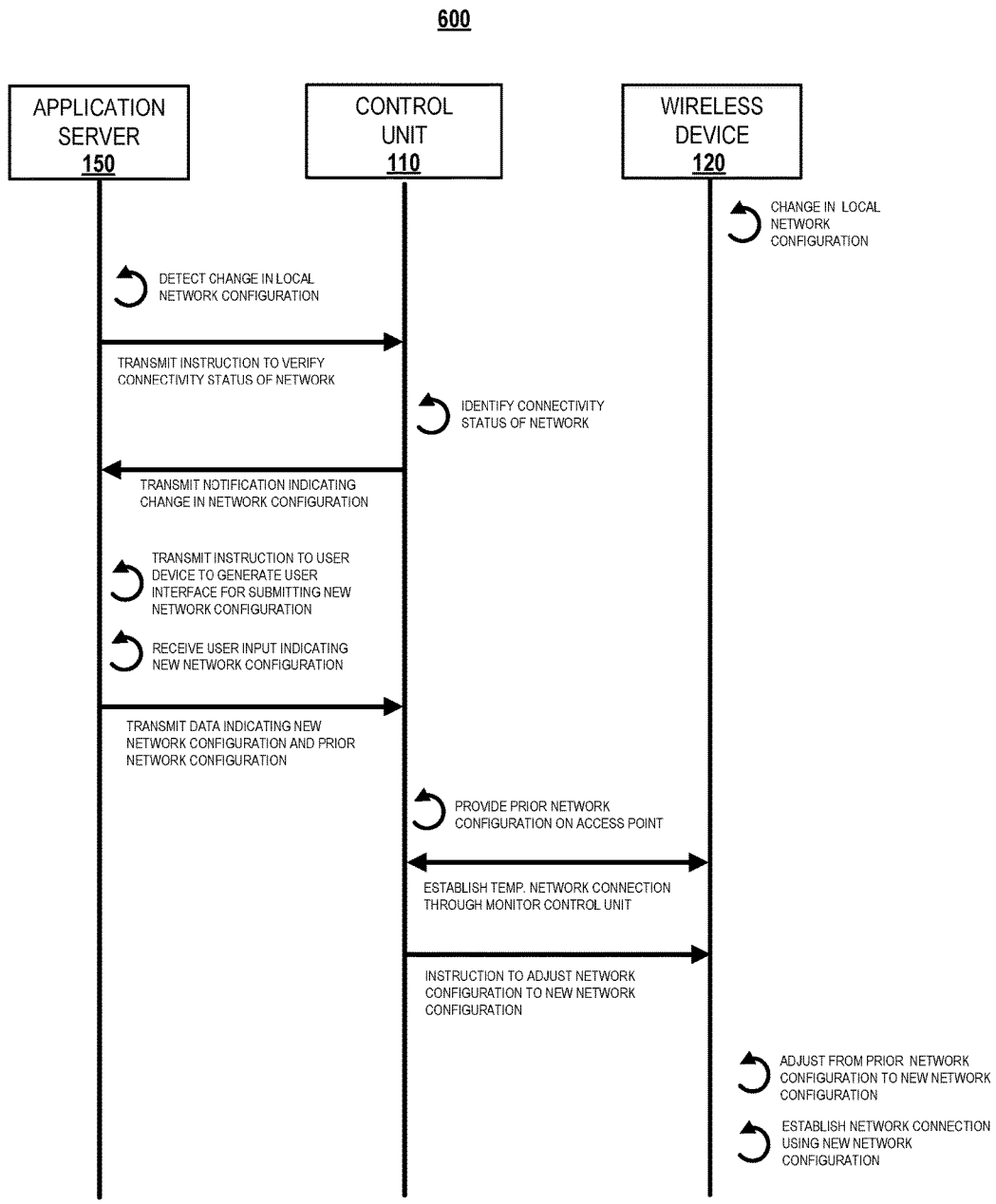
FIG. 6 illustrates an example of a technique for restoring a wireless network connection in response a network configuration adjustment.

FIG. 6 illustrates an example of an implementation 600 for restoring a wireless network connection in response a network configuration adjustment. Initially, a network configuration for the network 105 is adjusted based on, for example, a user adjusting the SSID and/or password of the network configuration, a network configuration reset by a user or an internet service provider of the property 101.

The application server 150 then detects the change in network configuration for the network 105. The change in network configuration can be based on, for example, a detected configuration change to a network access point associated with the network 105, or obtaining a network connectivity report indicating that the devices of the system 100A (e.g., the appliances 132, the sensors 134, etc.) are no longer capable of connecting over the network 105.

After detecting the change in network configuration for the network 105, the application server 150 then transmits an instruction to the control unit 110 to verify a connectivity status of the network 105. The instruction may be transmitted over an alternative connection that is independent from the network 105 (e.g., a cellular network connection between the application server 150 and the control unit 110). The control unit 110 then performs one or more network connectivity tests to confirm that a connectivity status indicates that the network configuration of the network 105 has changed, and as a result, the wireless device 120 is unable to connect to the network 105.

Once the control unit 110 confirms that the connectivity status indicates that the network configuration of the network 105 has changed, the control unit 110 transmits a notification indicating the confirmed connectivity status to the application server 150. In response, the application server 150 transmits an instruction to the user device 140 to generate user interface that requests the user 102 to submit a new network configuration (e.g., a new SSID and/or password) for the network 105. Additionally, or alternatively, the application server 150 may also transmit the instruction to one or more other devices of the system 100A. For example, the application server 150 may transmit the instruction to the control unit 110 so that the user may be requested to input the new network configuration directly on a display associated with the control unit 110.

Once the user 102 has provided a user input indicating the new network configuration on a user interface provided for output on the applicable device, data indicating the received user input is then transmitted to the application server 150. The application server 150 then generates an instruction that includes both the new network configuration and the prior network configuration for the network 105. The application server 150 then transmits the generated instruction to the control unit 110.

After receiving the instruction from the application server 150, the control unit reconfigures its access point to provide the prior SSID and password of the network 105. Because the network configuration of the access point is reconfigured to the prior network configuration of the network 105, the wireless device 120 is then capable of establishing a temporary network connection through the access point of the control unit 110.

After establishing the temporary network connection with the wireless device 120, the control unit 110 then transmits an instruction to the wireless device 120 to adjust the network configuration of the wireless device 120 from the prior network configuration to the new network configuration. The instruction received at the wireless device 120 causes an adjustment from the prior network configuration to the new network configuration, which then enables the wireless device 120 to connect to the network 105.

In some implementations, instead transmitting an instruction to the control unit 110 to start providing the prior network configuration through its access point, the application server 150 may additionally or alternatively transmit an instruction to the user device 140 to initiate providing the prior network configuration through its access point. For example, in such implementations, the user device 140 may run a native application that enables the application server 150 to transmit configuration instructions to the user device 140. The instruction may, for example, enable a personal hotspot that enables a wireless access point through the user device 140 using its cellular network connection. The instruction may also configure the personal hotspot such that the SSID and password of the mobile hotspot is the prior SSID and password of the network 105. The user device 140 then establishes a temporary network connection with the wireless device 120.

After establishing the temporary connection with the wireless device 120, the user device 140 may then transmit a subsequent instruction to adjust the network configuration of the wireless device 120 in a manner similar to that described above.

Figure 7:
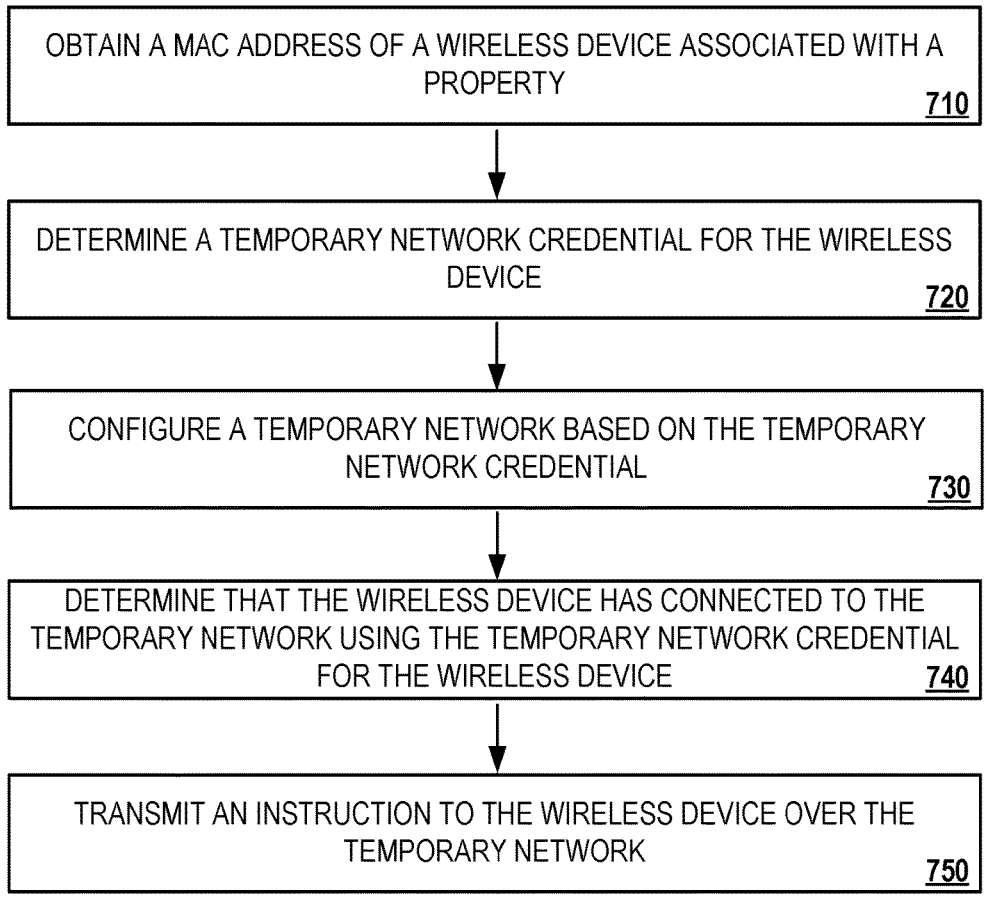
FIG. 7 illustrates an example of a process for provisioning a wireless network connection to a wireless device.

FIG. 7 illustrates an example of a process 700 for provisioning a wireless network connection to a wireless device. In general, the process 700 can include the operations of obtaining a MAC address of a wireless device associated with a property (710), determining a temporary network credential for the wireless device (720), configuring a temporary network based on the temporary network credential (730), determining that the wireless device has connected to the temporary network using the temporary network credential for the wireless device (740), and transmitting an instruction to the wireless device over the temporary network (750).

In general, the process 700 is discussed below in reference to the system 100, although the operations of the process 700 can be performed by any suitable system. Although the descriptions below refer to the control unit 110 performing the operations of the 700, the process 700 can additionally, or alternatively, be performed by one or more components of the system 100. For example, in some implementations, the operations of the process 700 are performed by the application server 150, the wireless device 120, the user device 140, and/or a router associated with the network 105. In other implementations, some of the operations of the process 700 are performed by multiple components of the system 100 such that certain operations, such as establishing communications with the wireless device 120, are performed remotely by the control unit 110 while other certain operations, such as generating a temporary network credential for the wireless device 120, are performed remotely on the application server 150. The descriptions below are in reference to the control unit 110 for simplicity.

In more detail, the process 700 can include the operation of obtaining a MAC address of a wireless device associated with a property (710). For example, in some instances, the control unit 110 can obtain a MAC address of the wireless device 120 by accessing a customer account associated with the property 101 (e.g., a customer account of the user 102 associated with the system 100A) and identifying a MAC address that is specified within the customer account. In such instances, once the user 102 purchases the wireless device 120, the customer account can be updated by, for instance, the device manufacturer and/or a device merchandiser, to include device information for the wireless device 120. As discussed above, the MAC address can be included in the device information within the customer account and can be assigned to the wireless device 120 during manufacturing. The MAC address can be detected by the control unit 110 once the wireless device 120 is turned on within the property 101. For example, as discussed above with respect to FIGS. 3A-3B, the control unit 110 can periodically scan for the MAC address of the wireless device 120.

Alternatively, in other instances, the control unit 110 can obtain a MAC address of the wireless device 120 based on detecting a signal transmitted by the wireless device 120 once it is turned on inside the property 101. For example, as discussed above, the wireless device 120 can be configured to transmit a Wi-Fi probe after being turned on, and the control unit 110 can detected the transmitted Wi-Fi probe to identify the MAC address of the wireless device 120. In such instances, the control unit 110 can access the customer account of the user 102 in response to identifying that the MAC address of the wireless device 120 within the Wi-Fi probe is a new MAC address (e.g., a MAC address that has not previously been detected within the property 101). In this regard, the control unit 110 can access the customer account of the user 102 prior to, or responsive to, detecting the presence of the wireless device 120 within the property 101.

The process 700 can include the operation of determining a temporary network credential for the wireless device (720). For example, the control unit 110 can determine the temporary network credential for the wireless device 120 based on the MAC address of the wireless device 120. As discussed above, the temporary network credential permits the wireless device 120 to connect to a temporary network. For example, as discussed above with respect to FIG. 1A, the temporary network credential can represent the temporary network configuration, which includes a temporary SSID and a temporary password associated with the SSID.

In some instances, the temporary network credential is a temporary SSID without a password. In such instances, the temporary network credential can be used by the control unit 110 to verify that the MAC address of the wireless device 120 is actually the device that is supposed to be provisioned wireless connectivity to the network 105. For example, the control unit 110 can use the temporary network credential to verify the identity of the wireless device 120 to prevent unauthorized wireless devices from obtaining network credentials that provide access to the network 105.

In some implementations, the control unit 110 determines the temporary network credential based on matching the obtained MAC address for the wireless device 120 and a pre-assigned MAC address that is specified within a customer account of the user 102. For instance, if the control unit 110 determines that the obtained MAC address for the wireless device 120 matches the pre-assigned MAC address that is specified within the customer account, then the control unit 110 verifies that the wireless device 120 represents the correct device to be installed within the property 101. For example, the control unit 110 can access an account for the user 102 that identifies a MAC address that is assigned to the wireless device 120 during manufacturing as discussed above. The control unit 110 can determine, based on accessing the account, that the wireless device 120 is associated with the customer account. For example, the wireless device 120 can be added to the account after the user 102 purchases the wireless device 120 and/or obtains device information from the manufacturer of the wireless device 120. The control unit 110 then identifies a default MAC address for the wireless device 120 within the account and then verifies the MAC address obtained in step 710 based on matching it to the default MAC address within the account.

The process 700 can include the operation of configuring a temporary network for the wireless device based on the temporary network credential (730). For example, the control unit 110 can configure a temporary network that accepts the temporary network credential for the wireless device 120 in order to connect to the wireless device 120 over the temporary network (e.g., the control unit 110 can serve as an access point that connects to the wireless network over the temporary network). As discussed above, the control unit 110 can host the temporary network with a temporary SSID and password that permits the wireless device 120 to establish a temporary network connection with the control unit 110 for data transmission.

In some implementations, the temporary network can be configured and/or hosted on device other than the control unit 110, such as a network router that operates as a DNS server of the network 105. In such implementations, the temporary network is configured by a permanent access point (e.g., the network router). In some other implementations, the temporary network is configured and/or hosted by a mobile device (e.g., the user device 140) that serves as a temporary access point for the temporary network. In such implementations, the user device 140 configures the temporary network to permit configuration of the wireless device 120, which is then reconfigured to connect to the permanent access point of the network 105. In some other implementations, such as those depicted in FIGS. 4A-C, the temporary network can be the wireless device 120, as discussed above. For example, the wireless device 120 can configure a temporary network using the default SSID and/or the password associated with the default SSID, and the control unit 110 can detect the network format based on data obtained from the application server 150.

The process 700 can include the operation of determining that the wireless device has connected to the temporary network using the temporary network credential for the wireless device (740). For example, the control unit 110 can determine that the wireless device 120 has connected to the temporary network using the temporary network credential. As discussed above, in some implementations, the SSID and the password of the temporary network can be set to the default SSID and password assigned to the wireless device 120 to permit the control unit 110 and the wireless device 120 to establish a temporary network connection with the control unit 110. In such implementations, the wireless device 120 can be configured to automatically connect to a network that has a SSID and password that matches its default SSID and password. In some instances, in response to detecting a network that has a SSID and password that matches its default SSID and password, the wireless device 120 can provide a user interface that allows the user 102 to confirm that the device is ready to be configured by the control unit 110. In other implementations, the temporary network credential can be provided as a means to verify the identity of the control unit 110 and the wireless device 120 prior to establishing the connection. In such implementations, the temporary network credential is represented by a SSID and password from a customer account. The control unit 110 uses the temporary network credential to confirm that the SSID and password specified within the customer account matches the default SSID and password assigned to the MAC address of wireless device 120. In some other implementations, the wireless device 120 automatically connects to the temporary network once it has identified a network access point that has an SSID and password that matches its default SSID and password, as discussed above.

The process 700 can include the operation of transmitting an instruction to the wireless device over the temporary network (750). For example, in response to determining that the wireless device 120 has connected to the temporary network, the control unit 110 can transmit an instruction to the wireless device 120. As discussed above, once the wireless device 120 receives the instruction, the instruction can cause the wireless device 120 to adjust a network configuration of the wireless device 120. For example, the adjustment can include changing the default SSID and password of the wireless device 120 to match the SSID and password of the network 105 within the property 101 during the initial installation of the wireless device 120. As another example, the adjustment can include changing the present network configuration of the wireless device 120 based on a detected change to the network configuration to the network 105 (e.g., a change to the current SSID and/or password for accessing the network 105). For example, as discussed above with respect to FIGS. 5 and 6, the control unit 110 can establish a temporary network connection with the wireless device 120 over the temporary network in response to detecting a change to the configuration of the network 105.

As discussed above, components of the system 100 can be configured according to various implementations to provision wireless connectivity to the wireless device 120. For example, as discussed above with respect to FIG. 2A, the MAC address of the wireless device is specified within a customer account associated with the property. In such implementations, the temporary network credential for the wireless device is determined based on the MAC address of the wireless device 120 and includes a temporary service set identifier. Additionally, configuring the temporary network includes configuring the temporary network based on the MAC address of the wireless device 120. The control unit 110 then detects a wireless probe transmitted from the MAC address of the wireless device 120. In response to detecting the wireless probe transmitted from the MAC address of the wireless device 120, the control unit 110 provides the temporary SSID over the temporary network as discussed above.

In some implementations, the operations of the process 700 discussed above can be partially and/or entirely performed by the application server 150. For example, as discussed above in FIG. 2B, the control unit 110 can obtain a first dynamic domain name system (DDNS) request for adjusting the network configuration of the wireless device 120. In such implementations, the instruction discussed above with respect to step 750 is transmitted in response to obtaining the first dynamic DDNS request. The control unit 110 then transmits the first DDNS request to the application server 150 for generating an instruction that enables the control unit 110 to configure the temporary network based on the temporary network credentials. The control unit 110 then obtains a second DDNS request indicating that the wireless device has adjusted the network configuration of the wireless device 120, and connected to the access point of the network 105. In response to obtaining the second DDNS request, the control unit 110 terminates providing of the temporary network credential for the wireless device 120 over the temporary network.

In some implementations, the temporary network credential for the wireless device 120 is used to configure the temporary network for a specified time period. For example, as discussed above with respect to FIG. 3A, the control unit 110 can obtain data indicating that the wireless device has been turned on during the specified time period and detected the temporary network credential. In such implementations, the connection with the wireless device 120 is established based on the obtained data indicating that the wireless device has been turned on during the specified time period and has detected the temporary network credential. For example, as discussed above, in such implementations, the control unit 110 can limit the time that the temporary network credential is provided based on when the wireless device 120 is turned on.

In some implementations, the temporary network credential for the wireless device 120 is provided for a specified time period and the control unit 110 generates the temporary network credentials based on user confirmation of a device installation. For example, as discussed above with respect to FIG. 3B, the control unit 110 obtains data indicating a user input confirming that the wireless device 120 is ready to establish a network connection. In such implementations, the temporary network credential is provided in response to obtaining the data the indicating the user input confirming that the wireless device is ready to establish the network connection.

In some implementations, the MAC address of the wireless device 120 is associated with the default network being available in the specified format by the wireless device. In such implementations, the temporary network credential for the wireless device 120 is determined based on the MAC address associated with the default network available in the specified format by the wireless device.

In some implementations, the temporary network credential is a credential associated with a prior network configuration of the local area network of the property. For example, the temporary network credential can be a SSID and associated password that was previously configured for the network 105 of the property 101. In this example, once the SSID and password of the network 105 is changed by the user, the control unit 110 and/or the application server 150 can use the prior SSID and password as the temporary network credential as discussed above.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method performed by a control unit of a monitoring system located in a property, the method comprising:

obtaining, by the control unit, data indicating a default network credential specified within a customer account associated with the monitoring system;

detecting, by the control unit, a wireless probe that (i) is broadcasted by a wireless device located in the property, and (ii) specifies a network credential associated the wireless device located in the property;

determining, by the control unit, that the network credential specified in the wireless probe matches the default network credential specified within the customer account;

based on determining that the network credential specified in the wireless probe matches the default network credential specified within the customer account:

configuring, by the control unit, a temporary network access point within the property;

establishing, by the control unit, a connection to the wireless device over the temporary network access point based on determining that the network credential specified in the wireless probe matches the default network credential assigned to the customer account; and in response to establishing the connection to the wireless device over the temporary network access point, transmitting, by the control unit and over the temporary network access point and to the wireless device, an instruction that, when received by the wireless device, causes the wireless device to adjust a network configuration of the wireless device.

2. The method of claim 1, wherein:

the wireless probe specifies a MAC address of the wireless device; and the method further comprises:

accessing, by the control unit, the customer account associated with the property;

determining, by the control unit and based on accessing the customer account, that the wireless device is associated with the customer account;

identifying a verified MAC address for the wireless device that is specified within the customer account;

determining the verified MAC address for the wireless device specified within the customer account matches the MAC address specified by the wireless probe; and in response to determining the verified MAC address for the wireless device specified within the customer account matches the MAC address specified by the wireless probe, configuring a temporary service set identifier for the temporary network access point based on the default network credential specified within the customer account.

3. The method of claim 1, wherein:

the instruction comprises a service set identifier of a local area network of the property and a password associated with the service set identifier of the local area network; and adjusting the network configuration of the wireless device comprises configuring the wireless device to connect to an access point of the local area network of the property using the service set identifier and the password.

4. The method of claim 2, wherein:

configuring the temporary network access point within the property comprises determining a temporary network credential for the wireless device;

the verified MAC address of the wireless device is specified within the customer account associated with the property;

configuring the temporary network access point within the property comprises determining a temporary network credential on the MAC address of the wireless device, wherein the temporary network credential comprises a temporary service set identifier; and configuring the temporary network access point comprises:
   configuring the temporary network access point based on the MAC address of the wireless device,
   in response to detecting the wireless probe transmitted from the MAC address of the wireless device, providing, over the temporary network, the temporary service set identifier.

5. The method of claim 3, further comprising:
obtaining, by the control unit and from the wireless device, a first request for adjusting the network configuration of the wireless device, wherein the instruction is transmitted in response to obtaining the first request;
obtaining, by the control unit and from the wireless device, a second request indicating that the wireless device has (i) adjusted the network configuration of the wireless device, and (ii) connected to the access point of the local area network of the property; and
in response to obtaining the second request, terminating, by the control unit, availability of the temporary network access point.

6. The method of claim 1, wherein:
configuring the temporary network access point within the property comprises determining a temporary network credential for the wireless device based on the default network credential specified within the customer account;
the temporary network credential for the wireless device is available for a specified time period; and
the method further comprises:
   obtaining, by the control unit, data indicating that the wireless device has (i) been turned on during the specified time period and (ii) detected the temporary network credential; and
the connection to the wireless device is established based on the obtained data indicating that the wireless device has been turned on during the specified time period and has detected the temporary network credential.

7. The method of claim 1, wherein:
configuring the temporary network access point within the property comprises determining a temporary network credential for the wireless device based on the default network credential specified within the customer account;
the temporary network credential for the wireless device is made available for a specified time period;
the method further comprises:
   obtaining, by the control unit, data indicating a user input confirming that the wireless device is ready to establish a network connection; and
the temporary network credential is made available in response to obtaining the data the indicating the user input confirming that the wireless device is ready to establish the network connection.

8. The method of claim 7, wherein:
the instruction comprises a service set identifier of a local area network of the property and a password associated with the service set identifier of the local area network; and
adjusting the network configuration of the wireless device comprises:
   adjusting a default service set identifier to the service set identifier of the local area network, and
   adjusting a default password associated with the default service set identifier to the password associated with the service set identifier of the local area network.

9. A system comprising:
one or more computers; and
one or more storage devices storing instructions that, when executed by the one or more computers, cause the one or more computers to perform operations comprising:
obtaining, by a control unit of a monitoring system located in a property, data indicating a default network credential specified within a customer account associated with the monitoring system;
detecting, by the control unit, a wireless probe that (i) is broadcasted by a wireless device located in the property, and (ii) specifies a network credential associated the wireless device located in the property;
determining, by the control unit, that the network credential specified in the wireless probe matches the default network credential specified within the customer account;
based on determining that the network credential specified in the wireless probe matches the default network credential specified within the customer account:
   configuring, by the control unit, a temporary network access point within the property;
   establishing, by the control unit, a connection to the wireless device over the temporary network access point based on determining that the network credential specified in the wireless probe matches the default network credential assigned to the customer account; and
in response to establishing the connection to the wireless device over the temporary network access point, transmitting, by the control unit and over the temporary network access point and to the wireless device, an instruction that, when received by the wireless device, causes the wireless device to adjust a network configuration of the wireless device.

10. The system of claim 9, wherein:
the wireless probe specifies a MAC address of the wireless device; and
the operations further comprise:
   accessing, by the control unit, the customer account associated with the property;
   determining, by the control unit and based on accessing the customer account, that the wireless device is associated with the customer account;
   identifying a verified MAC address for the wireless device that is specified within the customer account;
   determining the verified MAC address for the wireless device specified within the customer account matches the MAC address specified by the wireless probe; and
   in response to determining the verified MAC address for the wireless device specified within the customer account matches the MAC address specified by the wireless probe, configuring a temporary service identifier for the temporary network access point based on the default network credential specified within the customer account.

11. The system of claim 9, wherein:
the instruction comprises a service set identifier of a local area network of the property and a password associated with the service set identifier of the local area network; and adjusting the network configuration of the wireless device comprises configuring the wireless device to connect to an access point of the local area network of the property using the service set identifier and the password.

12. The system of claim 10, wherein:
configuring the temporary network access point within the property comprises determining a temporary network credential for the wireless device;
the verified MAC address of the wireless device is specified within the customer account associated with the property;
configuring the temporary network access point within the property comprises determining a temporary network credential on the MAC address of the wireless device, wherein the temporary network credential comprises a temporary service set identifier; and
configuring the temporary network access point comprises:
    configuring the temporary network access point based on the MAC address of the wireless device,
    in response to detecting the wireless probe transmitted from the MAC address of the wireless device, providing, over the temporary network, the temporary service set identifier.

13. The system of claim 11, wherein the operations further comprise:
obtaining, by the control unit and from the wireless device, a first request for adjusting the network configuration of the wireless device, wherein the instruction is transmitted in response to obtaining the first request;
obtaining, by the control unit and from the wireless device, a second request indicating that the wireless device has (i) adjusted the network configuration of the wireless device, and (ii) connected to the access point of the local area network of the property; and
in response to obtaining the second request, terminating, by the control unit, availability of the temporary network access point.

14. A non-transitory computer-readable storage device encoded with computer program instructions that, when executed by one or more computers, cause one or more computers to perform operations comprising:
obtaining, by a control unit of a monitoring system located in a property, data indicating a default network credential specified within a customer account associated with the monitoring system;
detecting, by the control unit, a wireless probe that (i) is broadcasted by a wireless device located in the property, and (ii) specifies a network credential associated the wireless device located in the property;
determining, by the control unit, that the network credential specified in the wireless probe matches the default network credential specified within the customer account;
based on determining that the network credential specified in the wireless probe matches the default network credential specified within the customer account:
    configuring, by the control unit, a temporary network access point within the property;
    establishing, by the control unit, a connection to the wireless device over the temporary network access point based on determining that the network credential specified in the wireless probe matches the default network credential assigned to the customer account; and
    in response to establishing the connection to the wireless device over the temporary network access point, transmitting, by the control unit and over the temporary network access point and to the wireless device, an instruction that, when received by the wireless device, causes the wireless device to adjust a network configuration of the wireless device.

15. The device of claim 14, wherein:
the wireless probe specifies a MAC address of the wireless device; and
the operations further comprise:
    accessing, by the control unit, the customer account associated with the property;
    determining, by the control unit and based on accessing the customer account, that the wireless device is associated with the customer account;
    identifying a verified MAC address for the wireless device that is specified within the customer account;
    determining the verified MAC address for the wireless device specified within the customer account matches the MAC address specified by the wireless probe; and
    in response to determining the verified MAC address for the wireless device specified within the customer account matches the MAC address specified by the wireless probe, configuring a temporary service identifier for the temporary network access point based on the default network credential specified within the customer account.

16. The device of claim 14, wherein:
the instruction comprises a service set identifier of a local area network of the property and a password associated with the service set identifier of the local area network; and
adjusting the network configuration of the wireless device comprises configuring the wireless device to connect to an access point of the local area network of the property using the service set identifier and the password.

17. The device of claim 15, wherein:
configuring the temporary network access point within the property comprises determining a temporary network credential for the wireless device;
the verified MAC address of the wireless device is specified within the customer account associated with the property;
configuring the temporary network access point within the property comprises determining a temporary network credential on the MAC address of the wireless device, wherein the temporary network credential comprises a temporary service set identifier; and
configuring the temporary network access point comprises:
    configuring the temporary network access point based on the MAC address of the wireless device,
    in response to detecting the wireless probe transmitted from the MAC address of the wireless device, providing, over the temporary network, the temporary service set identifier.

18. The device of claim 16, wherein the operations further comprise:
obtaining, by the control unit and from the wireless device, a first request for adjusting the network configuration of the wireless device, wherein the instruction is transmitted in response to obtaining the first request;

obtaining, by the control unit and from the wireless device, a second request indicating that the wireless device has (i) adjusted the network configuration of the wireless device, and (ii) connected to the access point of the local area network of the property; and in response to obtaining the second request, terminating, by the control unit, availability of the temporary network access point.

\* \* \* \* \*